US010871104B2

(12) United States Patent
Ulrey et al.

(10) Patent No.: US 10,871,104 B2
(45) Date of Patent: Dec. 22, 2020

(54) SYSTEMS AND METHODS FOR A SPLIT EXHAUST ENGINE SYSTEM

(71) Applicant: Ford Global Technologies, LLC, Dearborn, MI (US)

(72) Inventors: Joseph Norman Ulrey, Dearborn, MI (US); Daniel Paul Madison, Dearborn, MI (US); Brad Alan Boyer, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 554 days.

(21) Appl. No.: 15/666,963

(22) Filed: Aug. 2, 2017

(65) Prior Publication Data

US 2019/0040791 A1 Feb. 7, 2019

(51) Int. Cl.
*F02B 37/18* (2006.01)
*F02D 41/00* (2006.01)
(Continued)

(52) U.S. Cl.
CPC .............. *F02B 37/183* (2013.01); *F01N 3/10* (2013.01); *F01N 13/009* (2014.06);
(Continued)

(58) Field of Classification Search
CPC .... F01N 13/107; F01N 13/009; F02B 37/025; F02B 37/18-186; F02D 13/0257; F02M 26/42-44
See application file for complete search history.

(56) References Cited

U.S. PATENT DOCUMENTS 5,490,488 A 2/1996 Aversa et al.
6,347,619 B1 * 2/2002 Whiting .............. F02D 13/0276
123/563
(Continued)

FOREIGN PATENT DOCUMENTS

FR 2945579 B1 * 3/2013 .............. F02B 37/18
FR 3037357 B1 * 10/2018 .............. F02B 37/18
(Continued)

OTHER PUBLICATIONS

Ulrey, J. et al., "Systems and Methods for a Split Exhaust Engine System," U.S. Appl. No. 15/382,477, filed Dec. 16, 2016, 109 pages.
(Continued)

*Primary Examiner* — Audrey K Bradley
*Assistant Examiner* — Edward Bushard
(74) *Attorney, Agent, or Firm* — Geoffrey Brumbaugh; McCoy Russell LLP

(57) ABSTRACT

Methods and systems are provided for operating a split exhaust engine system that provides blowthrough air and exhaust gas recirculation (EGR) to an intake passage via a ported scavenge manifold. In one example, the ported scavenge manifold includes a first scavenge manifold coupled to a plurality of exhaust runners and a second scavenge manifold coupled to the plurality of exhaust runners via ports. The location of the ports on the exhaust runners combined with adjustments to a bypass valve coupled between the first scavenge manifold and an exhaust passage and an EGR valve coupled between the second scavenge manifold and the intake passage enables exhaust gas to be preferentially flowed to the exhaust passage and blowthrough air to be preferentially flowed to the intake passage under select operating conditions.

10 Claims, 8 Drawing Sheets

(51) Int. Cl.
*F02D 13/02* (2006.01)
*F01N 13/10* (2010.01)
*F02M 26/44* (2016.01)
*F01N 13/00* (2010.01)
*F02B 25/14* (2006.01)
*F02M 26/42* (2016.01)
*F02B 37/02* (2006.01)
*F02M 26/07* (2016.01)
*F02M 26/15* (2016.01)
*F02M 26/41* (2016.01)
*F01N 3/10* (2006.01)
*F02M 26/43* (2016.01)

(52) U.S. Cl.
CPC .......... *F01N 13/107* (2013.01); *F02B 25/145* (2013.01); *F02B 37/025* (2013.01); *F02D 13/0257* (2013.01); *F02D 13/0261* (2013.01); *F02D 41/0007* (2013.01); *F02D 41/0065* (2013.01); *F02M 26/07* (2016.02); *F02M 26/15* (2016.02); *F02M 26/41* (2016.02); *F02M 26/42* (2016.02); *F02M 26/44* (2016.02); *F01N 2410/00* (2013.01); *F02D 41/0055* (2013.01); *F02M 26/43* (2016.02)

(56) References Cited

U.S. PATENT DOCUMENTS

| | | | |
|---|---|---|---|
| 6,742,506 | B1 | 6/2004 | Grandin |
| 8,069,663 | B2 | 12/2011 | Ulrey et al. |
| 8,479,511 | B2 | 7/2013 | Pursifull et al. |
| 8,495,992 | B2 | 7/2013 | Roth |
| 8,511,084 | B2 | 8/2013 | Ulrey et al. |
| 8,528,530 | B2 * | 9/2013 | Freund ................ F02M 26/43 123/568.2 |
| 8,539,770 | B2 | 9/2013 | Williams |
| 8,601,811 | B2 | 12/2013 | Pursifull et al. |
| 8,701,409 | B2 | 4/2014 | Pursifull et al. |
| 9,080,523 | B1 | 7/2015 | Ulrey et al. |
| 2011/0041495 | A1 | 2/2011 | Yager |
| 2014/0230772 | A1 * | 8/2014 | Hayman ................ F01N 13/107 123/193.3 |
| 2015/0316005 | A1 | 11/2015 | Madison et al. |
| 2016/0169072 | A1 * | 6/2016 | Roth ................ F02D 41/0065 60/274 |

FOREIGN PATENT DOCUMENTS

| | | | | |
|---|---|---|---|---|
| JP | 11210449 A | * | 8/1999 | ......... F02D 13/0257 |
| WO | WO-2008046301 A1 | * | 4/2008 | .............. F01L 1/352 |
| WO | WO-2014070427 A1 | * | 5/2014 | ........... F01N 13/107 |
| WO | WO-2018169480 A1 | * | 9/2018 | ............. F02M 26/43 |

OTHER PUBLICATIONS

Ulrey, J. et al., "Systems and Methods for a Split Exhaust Engine System," U.S. Appl. No. 15/382,457, filed Dec. 16, 2016, 109 pages.

Leone, T. et al., "Systems and Methods for a Split Exhaust Engine System," U.S. Appl. No. 15/382,489, filed Dec. 16, 2016, 109 pages.

Ulrey, J. et al., "Systems and Methods for a Split Exhaust Engine System," U.S. Appl. No. 15/382,458, filed Dec. 16, 2016, 112 pages.

Ulrey, J. et al., "Systems and Methods for a Split Exhaust Engine System," U.S. Appl. No. 15/382,484, filed Dec. 16, 2016, 112 pages.

Ulrey, J. et al., "Systems and Methods for a Split Exhaust Engine System," U.S. Appl. No. 15/382,504, filed Dec. 16, 2016, 112 pages.

Ulrey, J. et al., "Systems and Methods for a Split Exhaust Engine System," U.S. Appl. No. 15/382,494, filed Dec. 16, 2016, 109 pages.

Ulrey, J. et al., "Systems and Methods for a Split Exhaust Engine System," U.S. Appl. No. 15/382,500, filed Dec. 16, 2016, 109 pages.

Ulrey, J. et al., "Systems and Methods for a Split Exhaust Engine System," U.S. Appl. No. 15/382,520, filed Dec. 16, 2016, 111 pages.

Boyer, B. et al., "Systems and Methods for a Split Exhaust Engine System," U.S. Appl. No. 15/382,538, filed Dec. 16, 2016, 112 pages.

Ulrey, J. et al., "Systems and Methods for a Split Exhaust Engine System," U.S. Appl. No. 15/382,556, filed Dec. 16, 2016, 112 pages.

Ulrey, J. et al., "Systems and Methods for a Split Exhaust Engine System," U.S. Appl. No. 15/382,549, filed Dec. 16, 2016, 113 pages.

Ulrey, J. et al., "Systems and Methods for a Split Exhaust Engine System," U.S. Appl. No. 15/382,479, filed Dec. 16, 2016, 111 pages.

Ulrey, J. et al., "Systems and Methods for a Split Exhaust Engine System," U.S. Appl. No. 15/382,509, filed Dec. 16, 2016, 109 pages.

Ulrey, J. et al., "Systems and Methods for a Split Exhaust Engine System," U.S. Appl. No. 15/382,532, filed Dec. 16, 2016, 111 pages.

Ulrey, J. et al., "Systems and Methods for a Split Exhaust Engine System," U.S. Appl. No. 15/382,548, filed Dec. 16, 2016, 111 pages.

* cited by examiner

SYSTEMS AND METHODS FOR A SPLIT EXHAUST ENGINE SYSTEM

FIELD

The present description relates generally to methods and systems for exhaust gas recirculation in an engine having a split exhaust system including a dual, ported scavenge manifold.

BACKGROUND/SUMMARY

Engines may use boosting devices, such as turbochargers, to increase engine power density. However, engine knock may occur due to increased combustion temperatures. Knock is especially problematic under boosted conditions due to high charge temperatures. The inventors herein have recognized that a split exhaust system, where a first exhaust manifold routes exhaust to a turbine of the turbocharger in an exhaust of the engine and a second exhaust manifold routes exhaust gas recirculation (EGR) to an intake of the engine, upstream of a compressor of the turbocharger, may decrease engine knock and increase engine efficiency. In such an engine system, each cylinder may include two intake valves and two exhaust valves, where a first set of cylinder exhaust valves (e.g., blowdown exhaust valves) are exclusively coupled to the first exhaust manifold, and a second set of cylinder exhaust valves (e.g., scavenge exhaust valves) are exclusively coupled to the second exhaust manifold. The first set of cylinder exhaust valves may be operated at a different timing than the second set of cylinder exhaust valves, thereby isolating a blowdown portion and a scavenging portion of exhaust gases. The timing of the second set of cylinder exhaust valves may also be coordinated with a timing of the cylinder intake valves to create a positive valve overlap period where fresh intake air (or a mixture of fresh intake air and EGR), referred to as blowthrough, may flow through the cylinders and back to the intake, upstream of the compressor, via an EGR passage coupled to the second exhaust manifold. Blowthrough air may remove residual exhaust gases from within the cylinders (referred to as scavenging). The inventors herein have recognized that by flowing a first portion of the exhaust gas (e.g., higher pressure exhaust) through the turbine and a higher pressure exhaust passage and flowing a second portion of the exhaust gas (e.g., lower pressure exhaust) and blowthrough air to the compressor inlet, combustion temperatures can be reduced while improving the turbine's work efficiency and engine torque.

However, the inventors herein have recognized potential issues with such systems. As one example, a flow rate or amount of EGR may be adjusted via an EGR valve disposed in the EGR passage. When the turbine speed is low (e.g., low engine speed/high load) or when the compressor inlet temperature is high (e.g., high engine speed/high load), EGR flow may be restricted by closing or partially closing the EGR valve. Under such restricted EGR flow conditions, the second exhaust manifold may become pressurized. When the second set of cylinder exhaust valves open during the subsequent engine cycle, the pressurized gas, comprising a mix of EGR and fresh intake air, may flow back into the cylinder and out of the first set of cylinder exhaust valves. However, excess oxygen in the blowthrough air may degrade a catalyst positioned downstream of the turbine.

In one example, the issues described above may be addressed by a method for an engine, comprising: from a first set of cylinder exhaust valves, flowing a first portion of exhaust gases to an exhaust passage, upstream of a turbocharger turbine; and from a second set of cylinder exhaust valves: first, flowing a second portion of exhaust gases to the exhaust passage, downstream of the turbocharger turbine and upstream of a catalyst; and then, flowing blowthrough air to an intake passage, upstream of a turbocharger compressor. In this way, both EGR flow to the turbocharger compressor and a flow of excess oxygen to the catalyst may be reduced.

As one example, the second portion of exhaust gases may be flowed from the second set of cylinder exhaust valves to the exhaust passage via a first scavenge manifold. The first scavenge manifold may be coupled to the exhaust passage, downstream of the turbocharger turbine and upstream of the catalyst, via a scavenge manifold bypass with a bypass valve disposed therein. Additionally, the blowthrough air may be flowed from the second set of cylinder exhaust valves to the intake passage via a second scavenge manifold, the second scavenge manifold fluidically coupled to the first scavenge manifold via a plurality of ports and exhaust runners. The second scavenge manifold may be coupled to the intake passage via an EGR passage with an EGR valve disposed therein. By opening the bypass valve while maintaining the EGR valve at least partially open, blowthrough air is preferentially flowed to the intake passage, upstream of the turbocharger compressor, via the second scavenge manifold, while exhaust gases are preferentially flowed to the exhaust passage via the first scavenge manifold. In this way, scavenge manifold pressurization is avoided while still reducing EGR flow to the turbocharger compressor. By continuing to flow cool blowthrough air to the compressor inlet, compressor inlet temperatures may be reduced. Further, by not flowing blowthrough air to the catalyst, catalyst degradation may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2 is shown approximately to scale.

DETAILED DESCRIPTION

Figure 1A:
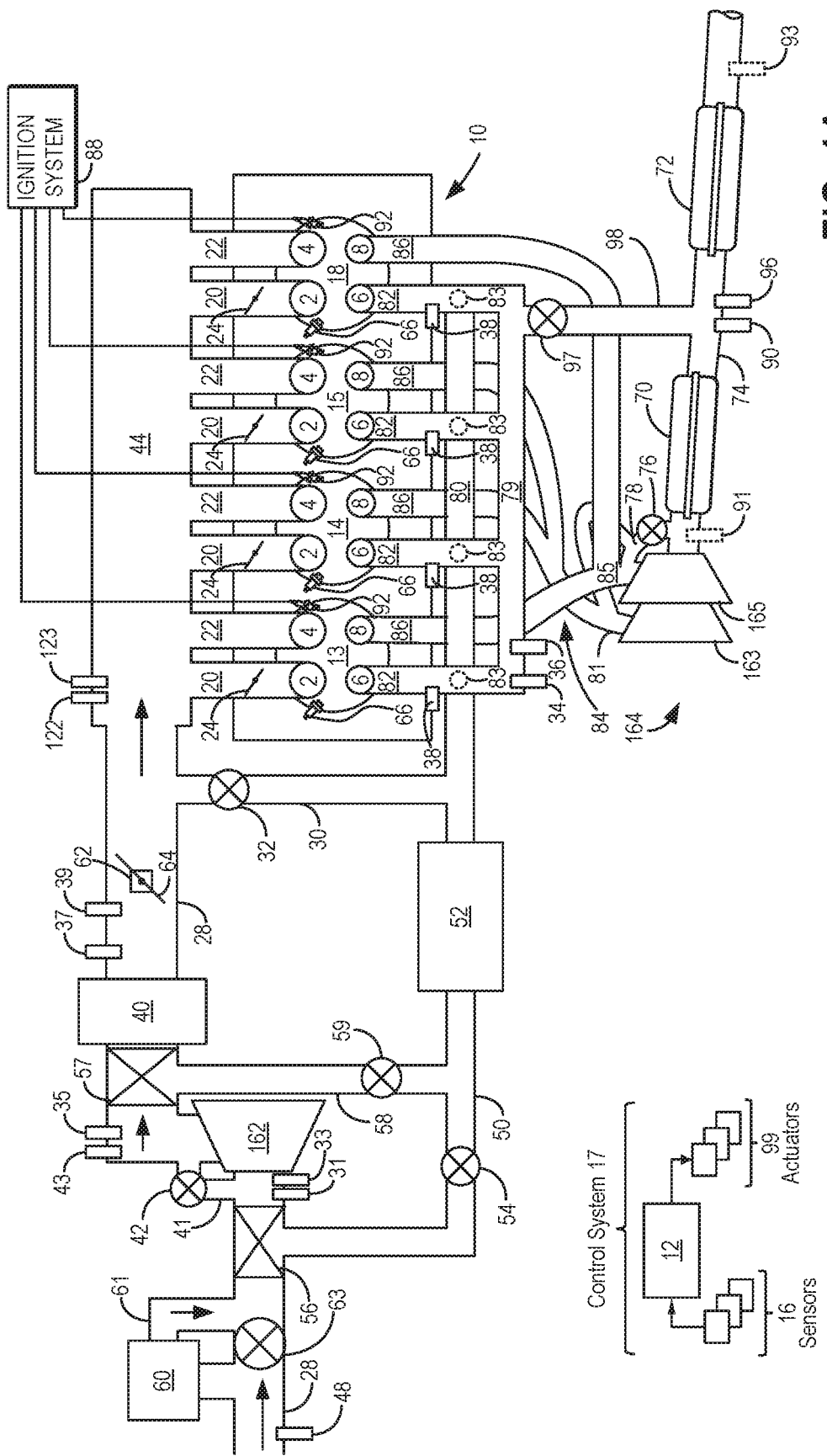
FIG. 1A shows a schematic depiction of a turbocharged engine system with a split exhaust system.
Figure 1B:
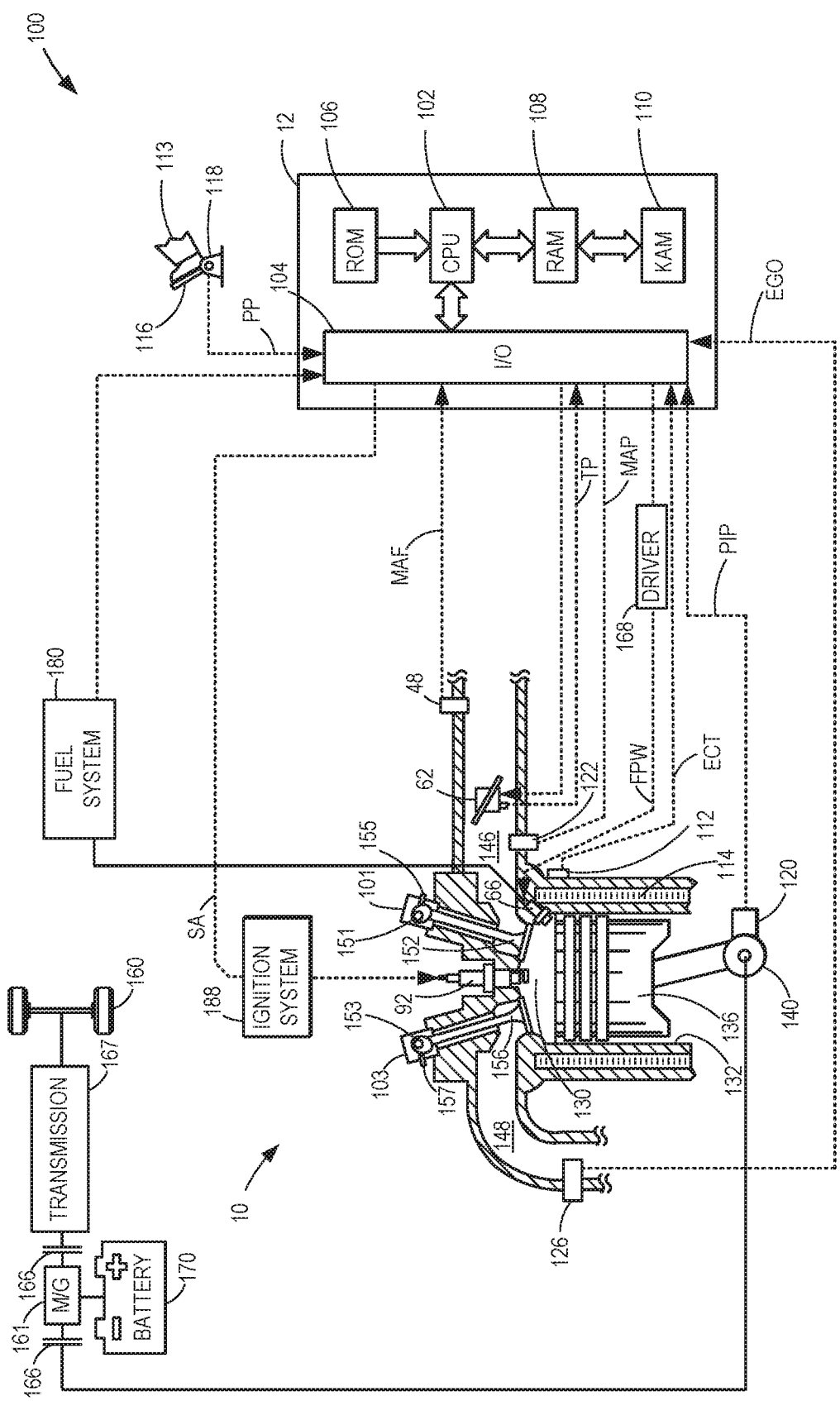
FIG. 1B shows an embodiment of a cylinder of the engine system of FIG. 1A.
Figure 3:
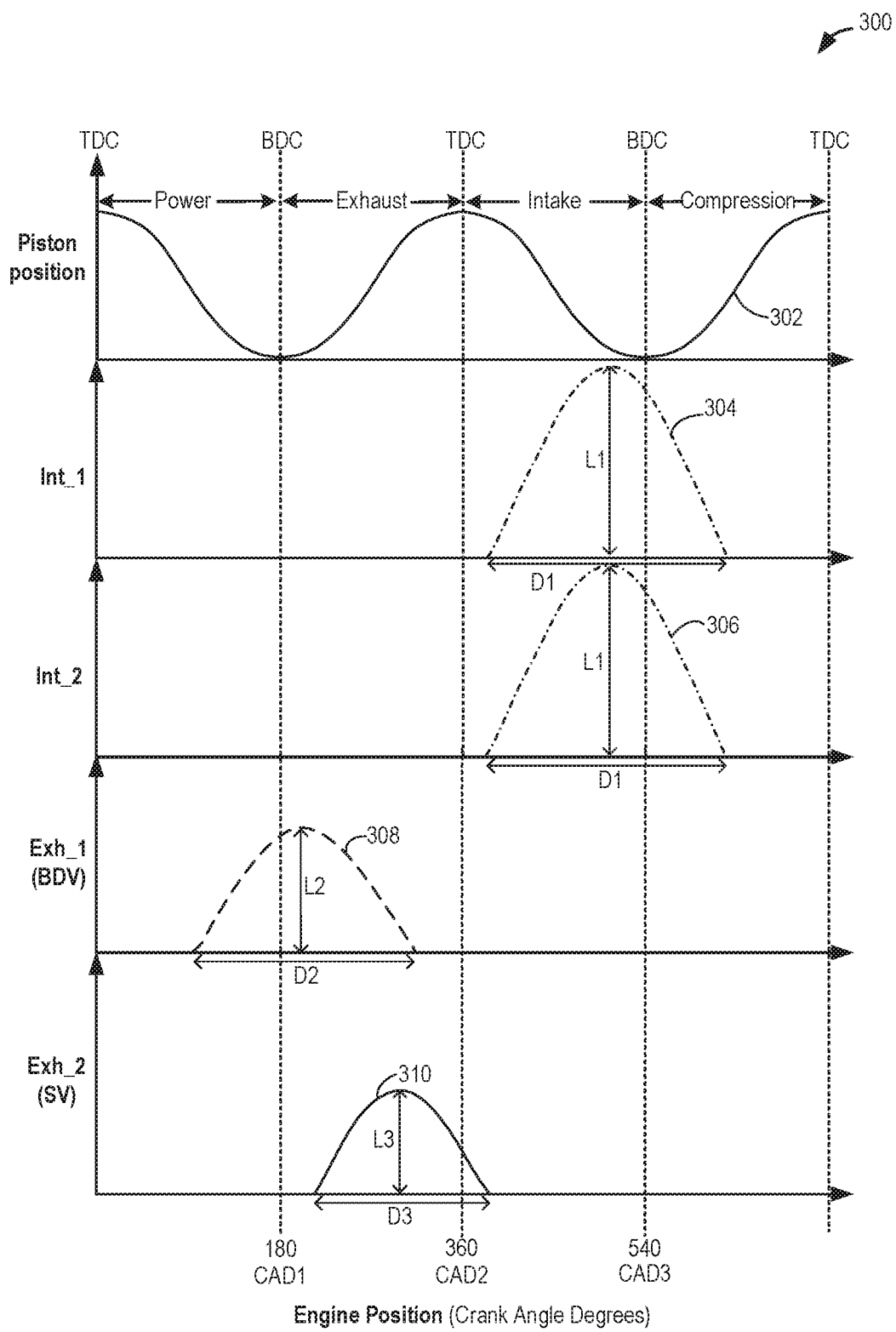
FIG. 3 shows example cylinder intake valve and exhaust valve timings for one engine cylinder of a split exhaust engine system.
Figure 4:
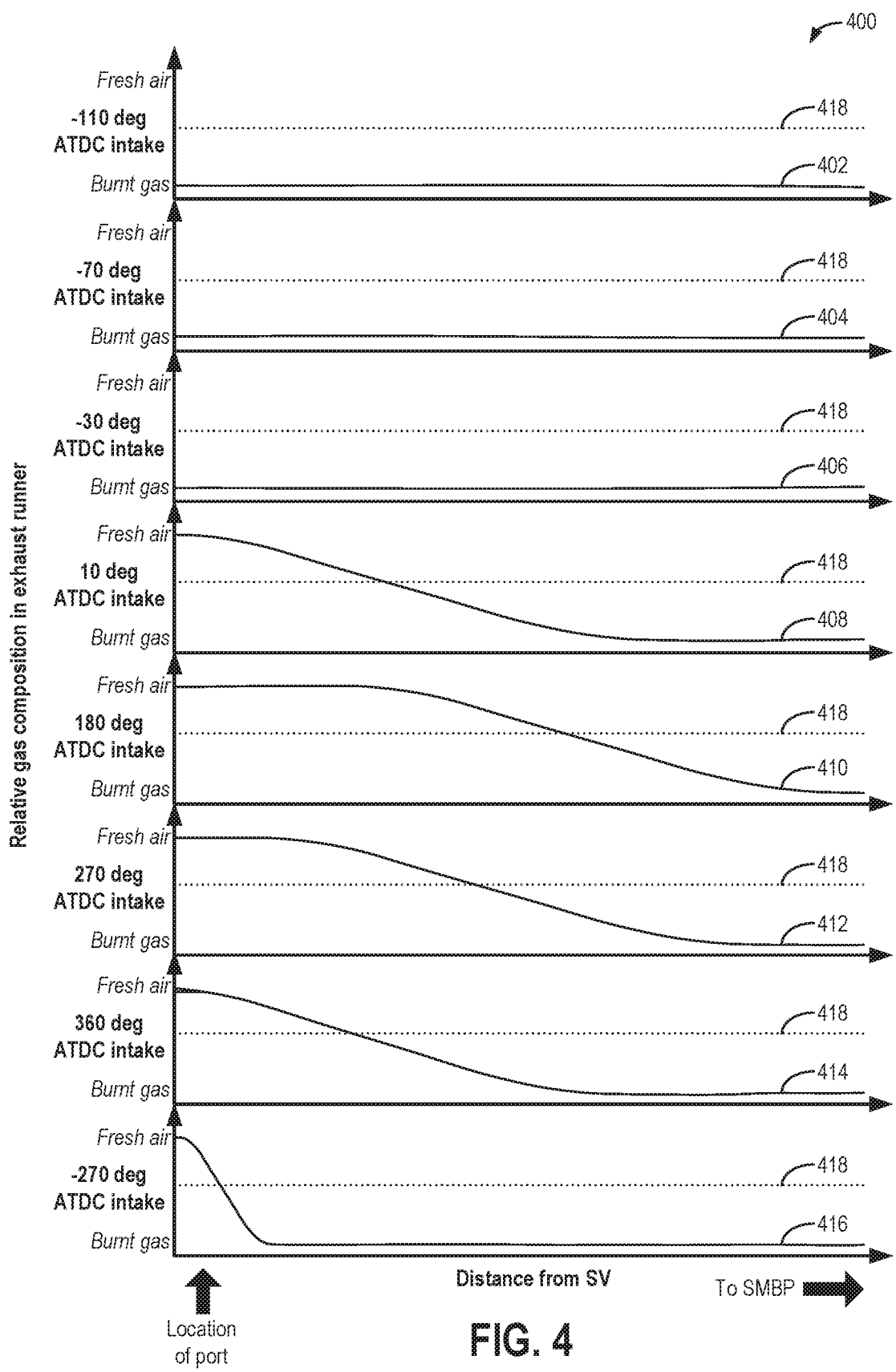
FIG. 4 shows an example graph depicting relative gas composition in an exhaust runner coupled to a ported scavenge manifold at different crank angle degrees of an engine cycle.
Figure 5:
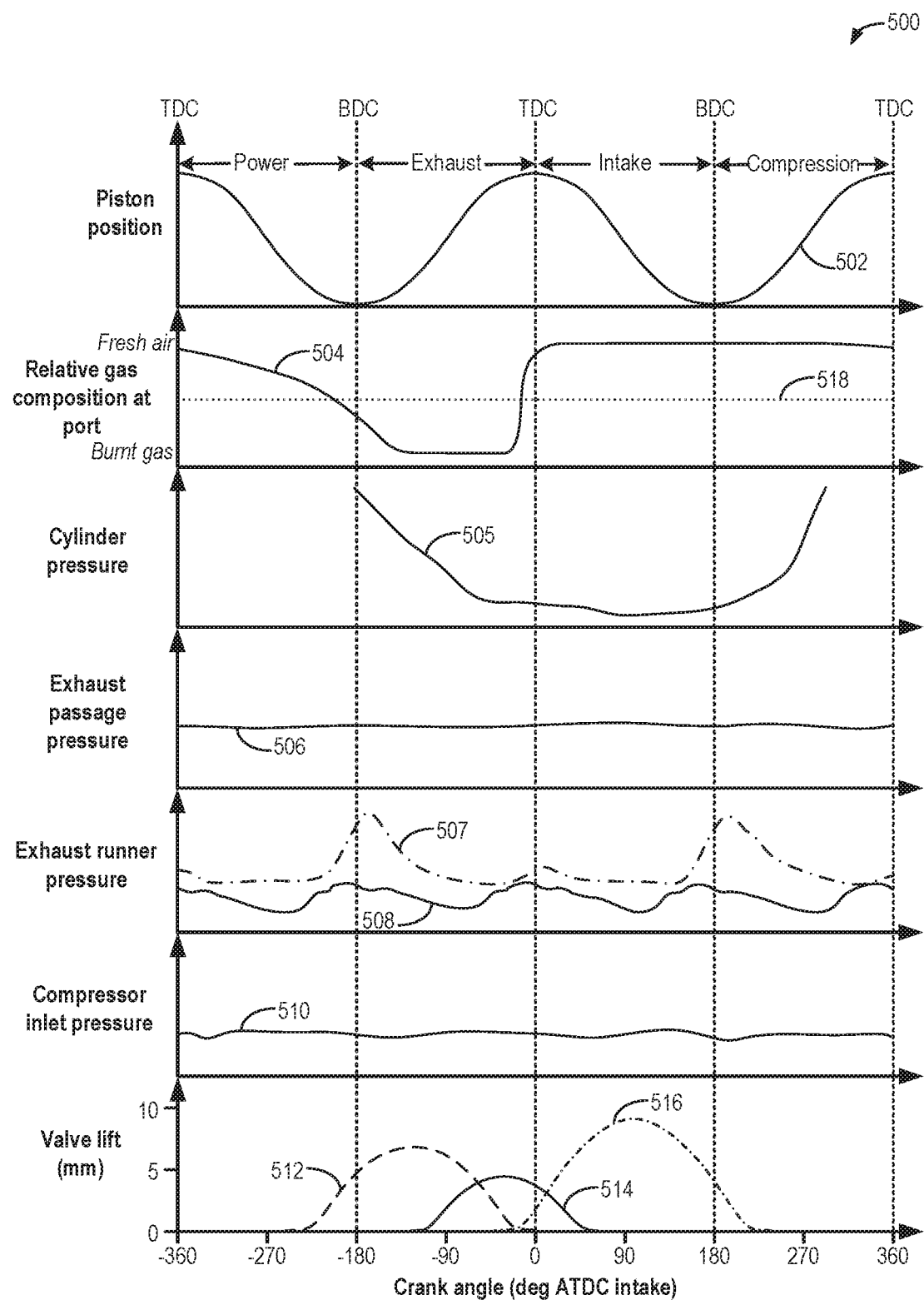
FIG. 5 shows an example of changes in gas composition at a scavenge manifold port with respect to cylinder valve timings.

The following description relates to systems and methods for operating a split exhaust engine with blowthrough and exhaust gas recirculation (EGR) to an intake via a first exhaust manifold. As shown in FIG. 1A, the split exhaust engine may include a first exhaust manifold (referred to herein as a blowdown exhaust manifold) coupled exclusively to a blowdown exhaust valve of each cylinder. The blowdown manifold is coupled to an exhaust passage of the engine, where the exhaust passage includes a turbocharger turbine and one or more emission control devices (which may include one or more catalysts). As shown in FIG. 1A and elaborated in FIG. 2, the split exhaust engine may also include a first scavenge manifold coupled exclusively to a scavenge exhaust valve of each cylinder via exhaust runners and a second scavenge manifold that is ported from each exhaust runner. The first scavenge manifold is coupled to the exhaust passage of the engine downstream of the turbocharger turbine via a scavenge manifold bypass passage, which includes a scavenge manifold bypass valve (SMBV), and the second exhaust manifold is coupled to the intake passage upstream of a turbocharger compressor via a first EGR passage, which includes a first EGR valve (referred to herein as a BTCC valve). Additionally, in some embodiments, the split exhaust engine system may include various valve actuation mechanisms and may be installed in a hybrid vehicle, as shown in FIG. 1B. The scavenge exhaust valves and blowdown exhaust valves for each cylinder may open and close at different times in an engine cycle in order to isolate scavenge and blowdown portions of combusted exhaust gases and direct these portions separately to the first and second scavenge manifolds and blowdown manifold, as shown at FIG. 3. Further, due to a gas composition gradient in the exhaust runners, as shown in FIGS. 4-5, the scavenge portion of combusted exhaust gases may be preferentially supplied to the exhaust passage via the first scavenge manifold while non-combusted blowthrough air is preferentially supplied to the compressor inlet via the second scavenge manifold under select operating conditions (e.g., when restricted compressor flow is desired) via adjustments to the BTCC valve and the SMBV, such as according to the example method of FIG. 6. FIG. 7 shows an example timing graph for adjusting the BTCC valve and SMBV responsive to restricted compressor flow conditions. For example, reduced flow to the compressor inlet may be desired under certain engine operating conditions, such as when compressor temperature reaches an upper threshold temperature. By preferentially flowing hotter exhaust gases from the scavenge exhaust valves to the exhaust via the scavenge manifold bypass passage and cooler blowthrough air to the compressor inlet via the EGR passage, temperatures and airflow at the compressor may be reduced while reducing the amount of oxygenated air flowing to the exhaust passage.

In the following description, a valve being operational or activated indicates that it is opened and/or closed according to determined timings during the combustion cycle for a given set of conditions. Likewise, a valve being deactivated or inoperative indicates that the valve is maintained closed, unless otherwise stated.

FIG. 1A shows a schematic diagram of a multi-cylinder internal combustion engine 10, which may be included in a propulsion system of an automobile. Engine 10 includes a plurality of combustion chambers (i.e., cylinders), which may be capped on the top by a cylinder head (not shown). In the example shown in FIG. 1A, engine 10 includes cylinders 13, 14, 15, and 18, arranged in an inline-4 configuration. It should be understood, however, that although FIG. 1A shows four cylinders, engine 10 may include any number of cylinders in any configuration, e.g., V-6, I-6, V-12, opposed 4, etc. Further, the cylinders shown in FIG. 1A may have a cylinder configuration, such as the cylinder configuration shown in FIG. 1B, as described further below. Each of cylinders 13, 14, 15, and 18 include two intake valves, including a first intake valve 2 and a second intake valve 4, and two exhaust valves, including a first exhaust valve (referred to herein as a blowdown exhaust valve, or blowdown valve) 8 and a second exhaust valve (referred to herein as a scavenge exhaust valve, or scavenge valve) 6. The intake valves and exhaust valves may be referred to herein as cylinder intake valves and cylinder exhaust valves, respectively.

As explained further below with reference to FIG. 1B, a timing (e.g., opening timing, closing timing, opening duration, etc.) of each of the intake valves may be controlled via various camshaft timing systems. In one embodiment, both the first intake valves 2 and second intake valves 4 may be controlled at a same valve timing (e.g., such that they open and close at the same time in the engine cycle). In an alternate embodiment, the first intake valves 2 and second intake valves 4 may be controlled at different valve timings. Further, the first exhaust valves 8 may be controlled at a different valve timing than the second exhaust valves 6 (e.g., such that a first exhaust valve and a second exhaust valve of a same cylinder open at different times than one another and close at different times than one another), as discussed further below.

Each cylinder receives intake air (or a mixture of intake air and recirculated exhaust gas, as explained further below) from an intake manifold 44 via an air intake passage 28. Intake manifold 44 is coupled to the cylinders via intake ports (e.g., runners). For example, intake manifold 44 is shown in FIG. 1A coupled to each first intake valve 2 of each cylinder via first intake ports 20. Further, the intake manifold 44 is coupled to each second intake valve 4 of each cylinder via second intake ports 22. In this way, each cylinder intake port can selectively communicate with the cylinder it is coupled to via a corresponding one of the first intake valves 2 or second intake valves 4. Each intake port may supply air and/or fuel to the cylinder it is coupled to for combustion.

One or more of the intake ports may include a charge motion control device, such as a charge motion control valve (CMCV). As shown in FIG. 1A, each first intake port 20 of each cylinder includes a CMCV 24. CMCVs 24 may also be referred to as swirl control valves or tumble control valves. CMCVs 24 may restrict airflow entering the cylinders via first intake valves 2. In the example of FIG. 1A, each CMCV 24 may include a valve plate; however, other designs of the valve are possible. Note that for the purposes of this disclosure, the CMCV 24 is in the "closed" position when it is fully activated, and the valve plate may be fully tilted into the respective first intake port 20, thereby resulting in maximum air charge flow obstruction. Alternatively, the CMCV 24 is in the "open" position when deactivated, and the valve plate may be fully rotated to lie substantially parallel with airflow, thereby considerably minimizing or eliminating air charge flow obstruction. The CMCVs may principally be maintained in their "open" position and may only be activated "closed" when swirl conditions are desired.

As shown in FIG. 1A, only one intake port of each cylinder includes the CMCV 24. However, in alternate embodiments, both intake ports of each cylinder may include a CMCV 24. A controller 12 may actuate the CMCVs 24 (e.g., via a valve actuator that may be coupled to a rotating shaft directly coupled to each CMCV 24) to move the CMCVs into the open or closed positions, or a plurality of positions between the open and closed positions, in response to engine operating conditions (such as engine speed/load and/or when blowthrough via the second exhaust valves 6 is active). As referred to herein, blowthrough air or blowthrough combustion cooling (BTCC) may refer to intake air that flows from the one or more intake valves of each cylinder to second exhaust valves 6 during a valve opening overlap period between the intake valves and second exhaust valves 6 (e.g., a period when both the intake valves and second exhaust valves 6 are open at the same time), without combusting the blowthrough air.

A high pressure, dual stage, fuel system (such as the fuel system shown in FIG. 1B) may be used to generate fuel pressures at injectors 66. As such, fuel may be directly injected in the cylinders via injectors 66. A distributorless ignition system 88 provides an ignition spark to cylinders 13, 14, 15, and 18 via spark plugs 92 in response to controller 12. Cylinders 13, 14, 15, and 18 are each coupled to two exhaust ports for channeling the blowdown and scavenging portions of the combustion gases separately. Specifically, as shown in FIG. 1A, cylinders 13, 14, 15, and 18 exhaust a first portion of combustion gases (e.g., a blowdown portion) to a first exhaust manifold (referred to herein as a blowdown manifold) 84 via first exhaust runners (e.g., ports) 86 and exhaust a second portion of combustion gases (e.g., a scavenging portion) to a first scavenge manifold 79 via second exhaust runners (e.g., ports) 82 and/or to a second scavenge manifold 80 via the second exhaust runners 82 and ports 83. The first scavenge manifold 79 and second scavenge manifold 80 may be collectively referred to herein as the second exhaust manifold. Second exhaust runners 82 extend from cylinders 13, 14, 15, and 18 to first scavenge manifold 79. Additionally, second exhaust runners 82 are coupled to the second scavenge manifold 80 via ports 83, where each of the ports 83 is coupled to one of the second exhaust runners 82. Thus, the scavenging portion of combusted gases may flow to both first scavenge manifold 79 and second scavenge manifold 80. The configuration of first scavenge manifold 79, second scavenge manifold 80, and ports 83 will be further described below with respect to FIG. 2. Additionally, first exhaust manifold 84 includes a first manifold portion 81 and second manifold portion 85. First exhaust runners 86 of cylinders 13 and 18 (referred to herein as the outside cylinders) extend from cylinders 13 and 18 to the second manifold portion 85 of first exhaust manifold 84. Additionally, first exhaust runners 86 of cylinders 14 and 15 (referred to herein as the inside cylinders) extend from cylinders 14 and 15 to the first manifold portion 81 of first exhaust manifold 84.

Each exhaust runner can selectively communicate with the cylinder it is coupled to via an exhaust valve. For example, second exhaust runners 82 communicate with their respective cylinders via second exhaust valves 6, and first exhaust runners 86 communicate with their respective cylinders via first exhaust valves 8. Second exhaust runners 82 are isolated from first exhaust runners 86 when at least one exhaust valve of each cylinder is in a closed position.

Exhaust gases may not flow directly between exhaust runners 82 and 86. The exhaust system described above may be referred to herein as a split exhaust manifold system, where the first portion of exhaust gases from each cylinder are output to first exhaust manifold 84 and the second portion of exhaust gases from each cylinder are output to first scavenge manifold 79, and where the first exhaust manifold does not directly communicate with the scavenge manifolds (e.g., no passage directly couples the first exhaust manifold with the first or second scavenge manifolds, and thus the first and second portions of exhaust gases do not mix with one another within the first exhaust manifold and the scavenge manifolds).

Engine 10 includes a turbocharger, including a dual-stage exhaust turbine 164 and an intake compressor 162 coupled on a common shaft. Dual-stage turbine 164 includes a first turbine 163 and a second turbine 165. First turbine 163 is directly coupled to first manifold portion 81 of first exhaust manifold 84 and receives exhaust gases only from cylinders 14 and 15 via first exhaust valves 8 of cylinders 14 and 15. Second turbine 165 is directly coupled to second manifold portion 85 of first exhaust manifold 84 and receives exhaust gases only from cylinders 13 and 18 via first exhaust valves 8 of cylinders 13 and 18. Rotation of the first and second turbines drives rotation of compressor 162 disposed within the intake passage 28. As such, the intake air becomes boosted (e.g., pressurized) at the compressor 162 and travels downstream to intake manifold 44. Exhaust gases exit both first turbine 163 and second turbine 165 into a common exhaust passage 74. A wastegate may be coupled across the dual-stage turbine 164. Specifically, a wastegate valve 76 may be included in a bypass 78 coupled between each of the first manifold portion 81 and second manifold portion 85, upstream of an inlet to dual-stage turbine 164, and exhaust passage 74, downstream of an outlet of dual-stage turbine 164. In this way, a position of wastegate valve (referred to herein as a turbine wastegate) 76 controls an amount of boost provided by the turbocharger. In alternate embodiments, engine 10 may include a single stage turbine where all exhaust gases from the first exhaust manifold 84 are directed to an inlet of a same turbine.

Exhaust gases exiting dual-stage turbine 164 flow downstream in exhaust passage 74 to a first emission control device 70 and a second emission control device 72, second emission control device 72 arranged downstream in exhaust passage 74 from first emission control device 70. Emission control devices 70 and 72 may include one or more catalyst bricks, in one example. In some examples, emission control devices 70 and 72 may be three-way type catalysts (TWCs). In other examples, emission control devices 70 and 72 may include one or a plurality of a diesel oxidation catalyst (DOC) and a selective catalytic reduction catalyst (SCR). In yet another example, second emission control device 72 may include a particulate filter, such as a gasoline particulate filter (GPF) or a diesel particulate filter (DPF). In one example, first emission control device 70 may include a catalyst, and second emission control device 72 may include a GPF. After passing through emission control devices 70 and 72, exhaust gases may be directed out to a tailpipe.

Exhaust passage 74 further includes a plurality of exhaust sensors in electronic communication with controller 12 of a control system 17, as described further below. As shown in FIG. 1A, exhaust passage 74 includes a first oxygen sensor 90 positioned between first emission control device 70 and second emission control device 72. First oxygen sensor 90 may be configured to measure an oxygen content of exhaust gas entering second emission control device 72. Exhaust passage 74 may include one or more additional oxygen sensors positioned along exhaust passage 74, such as a second oxygen sensor 91 positioned between dual-stage turbine 164 and first emission control device 70 and/or a third oxygen sensor 93 positioned downstream of second emission control device 72. As such, second oxygen sensor 91 may be configured to measure the oxygen content of the exhaust gas entering first emission control device 70, and third oxygen sensor 93 may be configured to measure the oxygen content of exhaust gas exiting second emission control device 72. In one embodiment, the one or more oxygen sensors 90, 91, and 93 may be Universal Exhaust Gas Oxygen (UEGO) sensors. Alternatively, a two-state exhaust gas oxygen sensor may be substituted for oxygen sensors 90, 91, and 93.

Exhaust passage 74 may include various other sensors, such as one or more temperature and/or pressure sensors. For example, as shown in FIG. 1A, a pressure sensor 96 is positioned within exhaust passage 74 between first emission control device 70 and second emission control device 72. As such, pressure sensor 96 may be configured to measure the pressure of exhaust gas entering second emission control device 72. Both pressure sensor 96 and oxygen sensor 90 are arranged within exhaust passage 74 at a point where a flow passage 98 couples to exhaust passage 74. Flow passage 98 may be referred to herein as a scavenge manifold bypass passage (SMBP) 98. Scavenge manifold bypass passage 98 is directly coupled to and between first scavenge manifold 79 and exhaust passage 74. A valve 97 (referred to herein as the scavenge manifold bypass valve, SMBV) is disposed within scavenge manifold bypass passage 98 and is actuatable by controller 12 to adjust an amount of exhaust flow from first scavenge manifold 79 to exhaust passage 74 between first emission control device 70 and second emission control device 72.

Second scavenge manifold 80 is directly coupled to a first exhaust gas recirculation (EGR) passage 50. First EGR passage 50 is coupled directly between second scavenge manifold 80 and intake passage 28, upstream of compressor (e.g., turbocharger compressor) 162, and thus may be referred to as a low-pressure EGR passage. As such, exhaust gases (or blowthrough air, as explained further below) are directed from first scavenge manifold 79 to second scavenge manifold 80 via ports 83 and then to intake passage 28, upstream of compressor 162, via first EGR passage 50. As shown in FIG. 1A, first EGR passage 50 includes an EGR cooler 52 configured to cool exhaust gases flowing from the first and second scavenge manifolds to intake passage 28 and a first EGR valve 54 (which may be referred to herein as the BTCC valve). Controller 12 is configured to actuate and adjust a position of first EGR valve 54 in order to control an amount of air flow through first EGR passage 50. When first EGR valve 54 is in a closed position, no exhaust gases or intake air may flow from first scavenge manifold 79 and second scavenge manifold 80 to intake passage 28, upstream of compressor 162. Further, when first EGR valve 54 is in an open position, exhaust gases and/or blowthrough air may flow from first scavenge manifold 79 and second scavenge manifold 80 to intake passage 28, upstream of compressor 162. Controller 12 may additionally adjust first EGR valve 54 into a plurality of positions between fully open and fully closed.

A first ejector 56 is positioned at an outlet of first EGR passage 50 within intake passage 28. First ejector 56 may include a constriction or venturi that provides a pressure increase at the inlet of the compressor 162. As a result, EGR from first EGR passage 50 may be mixed with fresh air flowing through the intake passage 28 to the compressor 162. Thus, EGR from first EGR passage 50 may act as the motive flow on the first ejector 56. In an alternate embodiment, there may not be an ejector positioned at the outlet of EGR passage 50. Instead, an outlet of compressor 162 may be shaped as an ejector that lowers the gas pressure to assist in EGR flow (and thus, in this embodiment, air is the motive flow and EGR is the secondary flow). In yet another embodiment, EGR from EGR passage 50 may be introduced at the trailing edge of a blade of compressor 162, thereby allowing blowthrough air to intake passage 28 via first EGR passage 50.

A second EGR passage 58 may be coupled between first EGR passage 50 and intake passage 28. Specifically, as shown in FIG. 1A, second EGR passage 58 is coupled to first EGR passage 50 between EGR valve 54 and EGR cooler 52. In alternate embodiments, when second EGR passage 58 is included in the engine system, the system may not include EGR cooler 52. Additionally, second EGR passage 58 is directly coupled to intake passage 28, downstream of compressor 162. Due to this coupling, second EGR passage 58 may be referred to herein as a mid-pressure EGR passage. Further, as shown in FIG. 1A, second EGR passage 58 is coupled to intake passage 28 upstream of a charge air cooler (CAC) 40. CAC 40 is configured to cool intake air (which may be a mixture of fresh intake air from outside of the engine system and exhaust gases) as it passes through CAC 40. As such, recirculated exhaust gases from first EGR passage 50 and/or second EGR passage 58 may be cooled via CAC 40 before entering intake manifold 44. In an alternate embodiment, second EGR passage 58 may be coupled to intake passage 28 downstream of CAC 40. In this embodiment, there may be no EGR cooler 52 disposed within first EGR passage 50. Further, as shown in FIG. 1A, a second ejector 57 may be positioned within intake passage 28 at an outlet of second EGR passage 58.

A second (e.g., mid-pressure) EGR valve 59 is disposed within second EGR passage 58. Second EGR valve 59 is configured to adjust an amount of gas flow (e.g., blowthrough air or exhaust) through second EGR passage 58. Controller 12 may actuate EGR valve 59 into an open position (allowing flow thorough second EGR passage 58), closed position (blocking flow through second EGR passage 58), or plurality of positions between fully open and fully closed based on (e.g., as a function of) engine operating conditions. For example, actuating the EGR valve 59 may include the controller 12 sending an electronic signal to an actuator of the EGR valve 59 to move a valve plate of EGR valve 59 into an open position, closed position, or some position between fully open and fully closed. Based on system pressures and positions of alternate valves in the engine system, air may either flow toward intake passage 28 within second EGR passage 58 or toward second scavenge manifold 80 within second EGR passage 58.

Intake passage 28 further includes an electronic intake throttle 62 in communication with intake manifold 44. As shown in FIG. 1A, intake throttle 62 is positioned downstream of CAC 40. The position of a throttle plate 64 of throttle 62 can be adjusted by control system 17 via a throttle actuator (not shown) communicatively coupled to controller 12. By modulating intake throttle 62 while operating compressor 162, an amount of fresh air may be inducted from the atmosphere and/or an amount of recirculated exhaust gas from the one or more EGR passages and delivered to the engine cylinders via intake manifold 44 at a boosted pressure. To reduce compressor surge, at least a portion of the aircharge compressed by compressor 162 may be recirculated to the compressor inlet. A compressor recirculation passage 41 may be provided for recirculating compressed air from the compressor outlet, upstream of CAC 40, to the compressor inlet. A compressor recirculation valve (CRV) 42 may be provided for adjusting an amount of recirculation flow recirculated to the compressor inlet. In one example, CRV 42 may be actuated open via a command from controller 12 in response to actual or expected compressor surge conditions.

A third flow passage 30 (which may be referred to herein as a hot pipe) is coupled between second scavenge manifold 80 and intake passage 28. Specifically, a first end of third flow passage 30 is directly coupled to second scavenge manifold 80, and a second end of third flow passage 30 is directly coupled to intake passage 28 downstream of intake throttle 62 and upstream of intake manifold 44. A third valve 32 (e.g., a hot pipe valve) is disposed within third flow passage 30 and is configured to adjust an amount of air flow through third flow passage 30. Third valve 32 may be actuated into a fully open position, a fully closed position, or a plurality of positions between fully open and fully closed in response to an actuation signal sent to an actuator of third valve 32 from controller 12.

First scavenge manifold 79, second scavenge manifold 80, and/or second exhaust runners 82 may include one or more sensors (such as pressure, oxygen, and/or temperature sensors) disposed therein. For example, as shown in FIG. 1A, first scavenge manifold 79 includes a pressure sensor 34 and an oxygen sensor 36 disposed therein and configured to measure a pressure and oxygen content, respectively, of exhaust gases and blowthrough (e.g., intake) air exiting second exhaust valves 6 and entering first scavenge manifold 79. Additionally or alternatively to oxygen sensor 36, each second exhaust runner 82 may include an individual oxygen sensor 38 disposed therein. As such, an oxygen content of exhaust gases and/or blowthrough air exiting each cylinder via second exhaust valves 6 may be determined based on an output of oxygen sensors 38. In still other examples, second scavenge manifold 80 may additionally or alternatively include a pressure sensor and an oxygen sensor disposed therein and configured to measure a pressure and oxygen content, respectively of exhaust gases and blowthrough air that enters second scavenge manifold 80 from second exhaust runners 82 via ports 83.

In some embodiments, as shown in FIG. 1A, intake passage 28 may include an electric compressor 60. Electric compressor 60 is disposed in a bypass passage 61 that is coupled to intake passage 28 upstream and downstream of an electric compressor valve 63. Specifically, an inlet to bypass passage 61 is coupled to intake passage 28 upstream of electric compressor valve 63 and an outlet to bypass passage 61 is coupled to intake passage 28 downstream of electric compressor valve 63 and upstream of where first EGR passage 50 couples to intake passage 28. Further, the outlet of bypass passage 61 is coupled upstream of turbocharger compressor 162 in intake passage 28. Electric compressor 60 may be electrically driven by an electric motor using energy stored at an energy storage device. In one example, the electric motor may be part of electric compressor 60, as shown in FIG. 1A. When additional boost (e.g., increased pressure of the intake air above atmospheric pressure) is requested over an amount provided by compressor 162, controller 12 may activate electric compressor 60 such that it rotates and increases a pressure of intake air flowing through bypass passage 61. Further, controller 12 may actuate electric compressor valve 63 into a closed or partially closed position to direct an increased amount of intake air through bypass passage 61 and electric compressor 60.

Intake passage 28 may include one or more additional sensors (such as additional pressure, temperature, flow rate, and/or oxygen sensors). For example, as shown in FIG. 1A, intake passage 28 includes a mass air flow (MAF) sensor 48 disposed upstream of compressor 162, electric compressor valve 63, and where first EGR passage 50 couples to intake passage 28. An intake pressure sensor 31 and an intake temperature sensor 33 are positioned in intake passage 28 upstream of compressor 162 and downstream of where first EGR passage 50 couples to intake passage 28. An intake oxygen sensor 35 and an intake temperature sensor 43 may be located in intake passage 28 downstream of compressor 162 and upstream of CAC 40. An additional intake pressure sensor 37 may be positioned in intake passage 28 downstream of CAC 40 and upstream of throttle 62. In some embodiments, as shown in FIG. 1A, an additional intake oxygen sensor 39 may be positioned in intake passage 28 between CAC 40 and throttle 62. Further, an intake manifold pressure (e.g., MAP) sensor 122 and intake manifold temperature sensor 123 are positioned within intake manifold 44 upstream of all engine cylinders.

In some examples, engine 10 may be coupled to an electric motor/battery system (as shown in FIG. 1B) in a hybrid vehicle. The hybrid vehicle may have a parallel configuration, series configuration, or variation or combinations thereof. Further, in some embodiments, other engine configurations may be employed, for example, a diesel engine.

Engine 10 may be controlled at least partially by control system 17, including controller 12, and by input from a vehicle operator via an input device (not shown in FIG. 1A). Control system 17 is shown receiving information from a plurality of sensors 16 (various examples of which are described herein) and sending control signals to a plurality of actuators 99. As one example, sensors 16 may include pressure, temperature, and oxygen sensors located within the intake passage 28, intake manifold 44, exhaust passage 74, and first scavenge manifold 79, as described above. Other sensors may include a throttle inlet pressure (TIP) sensor for estimating a throttle inlet pressure (TIP) and/or a throttle inlet temperature sensor for estimating a throttle air temperature (TCT) coupled downstream of the throttle in the intake passage. Additional system sensors and actuators are elaborated below with reference to FIG. 1B. As another example, actuators 99 may include fuel injectors, valves 63, 42, 54, 59, 32, 97, 76, and throttle 62. Actuators 99 may further includes various camshaft timing actuators coupled to the cylinder intake and exhaust valves (as described further below with reference to FIG. 1B). Controller 12 may receive input data from the various sensors, process the input data, and trigger the actuators in response to the processed input data based on instruction or code programmed in a memory of controller 12 corresponding to one or more routines. An example control routine (e.g., method) is described herein with reference to FIG. 6. For example, adjusting EGR flow from second scavenge manifold 80 to intake passage 28 may include adjusting an actuator of first EGR valve 54 to adjust an amount of exhaust flowing to intake passage 28 upstream of compressor 162 from second scavenge manifold 80. In another example, adjusting EGR flow from second scavenge manifold 80 to intake passage 28 may include adjusting an actuator of an exhaust valve camshaft to adjust an opening timing of second exhaust valves 6.

In this way, the first and second exhaust manifolds of FIG. 1A may be designed to separately channel the blowdown and scavenging portions of the exhaust. First exhaust manifold 84 may channel the blowdown pulse of the exhaust to dual-stage turbine 164 via first manifold portion 81 and second manifold portion 85, while first scavenge manifold 79 may channel the scavenging portion of exhaust to intake passage 28 via ports 83, second scavenge manifold 80, and one or more of first EGR passage 50 and second EGR passage 58 and/or to exhaust passage 74 downstream of the dual-stage turbine 164 via scavenge manifold bypass passage 98. For example, first exhaust valves 8 channel the blowdown portion of the exhaust gases through first exhaust manifold 84 to the dual-stage turbine 164 and both first and second emission control devices 70 and 72, while second exhaust valves 6 channel the scavenging portion of exhaust gases through first scavenge manifold 79 and to either intake passage 28 via second scavenge manifold 80 and one or more EGR passages or to exhaust passage 74 and second emission control device 72 via scavenge manifold bypass passage 98.

It should be noted that while FIG. 1A shows engine 10 including each of first EGR passage 50, second EGR passage 58, scavenge manifold bypass passage 98, and flow passage 30, in alternate embodiments, engine 10 may only include a portion of these passages. For example, in one embodiment, engine 10 may only include first EGR passage 50 and scavenge manifold bypass passage 98 and not include second EGR passage 58 and flow passage 30. In another embodiment, engine 10 may include first EGR passage 50, second EGR passage 58, and scavenge manifold bypass passage 98, but not include flow passage 30. In yet another embodiment, engine 10 may include first EGR passage 50, flow passage 30, and scavenge manifold bypass passage 98, but not second EGR passage 58. In some embodiments, engine 10 may not include electric compressor 60. In still other embodiments, engine 10 may include all or only a portion of the sensors shown in FIG. 1A.

Referring now to FIG. 1B, it depicts a partial view of a single cylinder of internal combustion engine 10, which may be installed in a vehicle 100. As such, components previously introduced in FIG. 1A are represented with the same reference numbers and are not reintroduced. Engine 10 is depicted with combustion chamber (cylinder) 130, a coolant sleeve 114, and cylinder walls 132 with a piston 136 positioned therein and connected to a crankshaft 140. Combustion chamber 130 is shown communicating with an intake passage 146 and an exhaust passage 148 via respective intake valve 152 and exhaust valve 156. As previously described in FIG. 1A, each cylinder of engine 10 may exhaust combustion products along two conduits. In the depicted view, exhaust passage 148 represents the first exhaust runner (e.g., port) leading from the cylinder to the turbine (such as first exhaust runner 86 of FIG. 1A), while the second exhaust runner is not visible in this view.

As also previously elaborated in FIG. 1A, each cylinder of engine 10 may include two intake valves and two exhaust valves. In the depicted view, intake valve 152 and exhaust valve 156 are located at an upper region of combustion chamber 130. Intake valve 152 and exhaust valve 156 may be controlled by controller 12 using respective cam actuation systems including one or more cams. The cam actuation systems may utilize one or more of cam profile switching (CPS), variable cam timing (VCT), variable valve timing (VVT), and/or variable valve lift (VVL) systems to vary valve operation. In the depicted example, each intake valve 152 is controlled by an intake cam 151, and each exhaust valve 156 is controlled by an exhaust cam 153. The intake cam 151 may be actuated via an intake valve timing actuator 101, and the exhaust cam 153 may be actuated via an exhaust valve timing actuator 103 according to set intake and exhaust valve timings, respectively. In some examples, the intake valves and exhaust valves may be deactivated via the intake valve timing actuator 101 and exhaust valve timing actuator 103, respectively. For example, the controller may send a signal to the exhaust valve timing actuator 103 to deactivate the exhaust valve 156 such that it remains closed and does not open at its set timing. The position of intake valve 152 and exhaust valve 156 may be determined by valve position sensors 155 and 157, respectively. As introduced above, in one example, all exhaust valves of every cylinder may be controlled on a same exhaust camshaft. As such, both a timing of the scavenge (second) exhaust valves and the blowdown (first) exhaust valves may be adjusted together via one camshaft, but they may each have different timings relative to one another. In another example, the scavenge exhaust valve of every cylinder may be controlled on a first exhaust camshaft, and a blowdown exhaust valve of every cylinder may be controlled on a different, second exhaust camshaft. In this way, the valve timing of the scavenge valves and blowdown valves may be adjusted separately from one another. In alternate embodiments, the cam or valve timing system(s) of the scavenge and/or blowdown exhaust valves may employ a cam in cam system, an electro-hydraulic type system on the scavenge valves, and/or an electro-mechanical valve lift control on the scavenge valves.

For example, in some embodiments, the intake and/or exhaust valve may be controlled by electric valve actuation. For example, cylinder 130 may alternatively include an intake valve controlled via electric valve actuation and an exhaust valve controlled via cam actuation, including CPS and/or VCT systems. In still other embodiments, the intake and exhaust valves may be controlled by a common valve actuator (or actuation system) or a variable valve timing actuator (or actuation system).

In one example, intake cam 151 includes separate and different cam lobes that provide different valve profiles (e.g., valve timing, valve lift, duration, etc.) for each of the two intake valves of combustion chamber 130. Likewise, exhaust cam 153 may include separate and different cam lobes that provide different valve profiles (e.g., valve timing, valve lift, duration, etc.) for each of the two exhaust valves of combustion chamber 130. In another example, intake cam 151 may include a common lobe or similar lobes that provide a substantially similar valve profile for each of the two intake valves.

In addition, different cam profiles for the different exhaust valves can be used to separate exhaust gases exhausted at low cylinder pressure from exhaust gases exhausted at exhaust pressure. For example, a first exhaust cam profile can open the first exhaust valve (e.g., blowdown valve) from a closed position just before BDC (bottom dead center) of the power stroke of combustion chamber 130 and close the same exhaust valve well before top dead center (TDC) to selectively exhaust blowdown gases from the combustion chamber. Further, a second exhaust cam profile can be positioned to open the second exhaust valve (e.g., scavenge valve) from a closed position before a mid-point of the exhaust stroke and close it after TDC to selectively exhaust the scavenging portion of the exhaust gases.

Thus, the timing of the first exhaust valve and the second exhaust valve can isolate cylinder blowdown gases from the scavenging portion of exhaust gases while any residual exhaust gases in the clearance volume of the cylinder can be cleaned out with fresh intake air blowthrough during positive valve overlap between the intake valve and the scavenge exhaust valve. By flowing a first portion of the exhaust gas leaving the cylinders (e.g., higher pressure exhaust) to the turbine(s) and a higher pressure exhaust passage and flowing a later, second portion of the exhaust gas (e.g., lower pressure exhaust) and blowthrough air to the compressor inlet, the engine system efficiency is increased. Turbine energy recovery may be enhanced, and engine efficiency may be increased via increased EGR and reduced knock.

Continuing with FIG. 1B, exhaust gas sensor 126 is shown coupled to exhaust passage 148. Sensor 126 may be positioned in the exhaust passage upstream of one or more emission control devices, such as devices 70 and 72 of FIG. 1A. Sensor 126 may be selected from among various suitable sensors for providing an indication of exhaust gas air/fuel ratio, such as a linear oxygen sensor or UEGO (universal or wide-range exhaust gas oxygen), a two-state oxygen sensor or EGO (as depicted), a HEGO (heated EGO), a NOx, a HC, or a CO sensor, for example. The downstream emission control devices may include one or more of a TWC, a NOx trap, a GPF, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc.

Cylinder 130 can have a compression ratio, which is the ratio of volumes when piston 136 is at BDC to TDC. Conventionally, the compression ratio is in the range of 9:1 to 10:1. However, in some examples, such as where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 92 for initiating combustion. Ignition system 188 can provide an ignition spark to combustion chamber 130 via spark plug 92 in response to spark advance signal SA from controller 12, under select operating modes. However, in some embodiments, spark plug 92 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 130 is shown including one fuel injector 66. Fuel injector 66 is shown coupled directly to combustion chamber 130 for injecting fuel directly therein in proportion to the pulse width of signal FPW received from controller 12 via electronic driver 168. In this manner, fuel injector 66 provides what is known as direct injection (hereafter also referred to as "DI") of fuel into combustion chamber 130. While FIG. 1B shows injector 66 as a side injector, it may also be located overhead of the piston, such as near the position of spark plug 92. Such a position may increase mixing and combustion when operating the engine with an alcohol-based fuel due to the lower volatility of some alcohol-based fuels. Alternatively, the injector may be located overhead and near the intake valve to increase mixing. In an alternate embodiment, injector 66 may be a port injector providing fuel into the intake port upstream of cylinder 130.

Fuel may be delivered to fuel injector 66 from a high pressure fuel system 180 including fuel tanks, fuel pumps, and a fuel rail. Alternatively, fuel may be delivered by a single stage fuel pump at a lower pressure, in which case the timing of the direct fuel injection may be more limited during the compression stroke than if a high pressure fuel system is used. Further, while not shown, the fuel tanks may have a pressure transducer providing a signal to controller 12. Fuel tanks in fuel system 180 may hold fuel with different fuel qualities, such as different fuel compositions. These differences may include different alcohol content, different octane, different heat of vaporizations, different fuel blends, and/or combinations thereof, etc. In some embodiments, fuel system 180 may be coupled to a fuel vapor recovery system including a canister for storing refueling and diurnal fuel vapors. The fuel vapors may be purged from the canister to the engine cylinders during engine operation when purge conditions are met. For example, the purge vapors may be naturally aspirated into the cylinder via the first intake passage at or below barometric pressure.

Engine 10 may be controlled at least partially by controller 12 and by input from a vehicle operator 113 via an input device 118, such as an accelerator pedal 116. The input device 118 sends a pedal position (PP) signal to controller 12. Controller 12 is shown in FIG. 1B as a microcomputer, including a microprocessor unit 102, input/output ports 104, an electronic storage medium for executable programs and calibration values shown as a read-only memory 106 in this particular example, random access memory 108, keep alive memory 110, and a data bus. Storage medium read-only memory 106 can be programmed with computer readable data representing instructions executable by microprocessor 102 for performing the methods and routines described below as well as other variants that are anticipated but not specifically listed. Controller 12 may receive various signals from sensors coupled to engine 10, in addition to those signals previously discussed, including measurement of inducted mass air flow (MAF) from mass air flow sensor 48; engine coolant temperature (ECT) from a temperature sensor 112 coupled to coolant sleeve 114; a profile ignition pickup signal (PIP) from a Hall effect sensor 120 (or other type) coupled to crankshaft 140; throttle position (TP) from a throttle position sensor; absolute manifold pressure signal (MAP) from MAP sensor 122; cylinder AFR from EGO sensor 126; and abnormal combustion from a knock sensor and a crankshaft acceleration sensor. Engine speed signal, RPM, may be generated by controller 12 from signal PIP. Manifold pressure signal MAP from a manifold pressure sensor (such as MAP sensor 122) may be used to provide an indication of vacuum or pressure in the intake manifold.

Based on input from one or more of the above-mentioned sensors, controller 12 may adjust one or more actuators, such as fuel injector 66, throttle 62, spark plug 92, intake/exhaust valves and cams, etc. The controller may receive input data from the various sensors, process the input data, and trigger the actuators in response to the processed input data based on instruction or code programmed therein corresponding to one or more routines.

In some examples, vehicle 100 may be a hybrid vehicle with multiple sources of torque available to one or more vehicle wheels 160. In other examples, vehicle 100 is a conventional vehicle with only an engine, or an electric vehicle with only electric machine(s). In the example shown in FIG. 1B, vehicle 100 includes engine 10 and an electric machine 161. Electric machine 161 may be a motor or a motor/generator and thus may also be referred to herein as an electric motor. Crankshaft 140 of engine 10 and electric machine 161 are connected via a transmission 167 to vehicle wheels 160 when one or more clutches 166 are engaged. In the depicted example, a first clutch 166 is provided between crankshaft 140 and electric machine 161, and a second clutch 166 is provided between electric machine 161 and transmission 167. Controller 12 may send a signal to an actuator of each clutch 166 to engage or disengage the clutch, so as to connect or disconnect crankshaft 140 from electric machine 161 and the components connected thereto, and/or connect or disconnect electric machine 161 from transmission 167 and the components connected thereto. Transmission 167 may be a gearbox, a planetary gear system, or another type of transmission. The powertrain may be configured in various manners including as a parallel, a series, or a series-parallel hybrid vehicle.

Electric machine 161 receives electrical power from a traction battery 170 to provide torque to vehicle wheels 160. Electric machine 161 may also be operated as a generator to provide electrical power to charge battery 170, for example during a braking operation.

Figure 2:
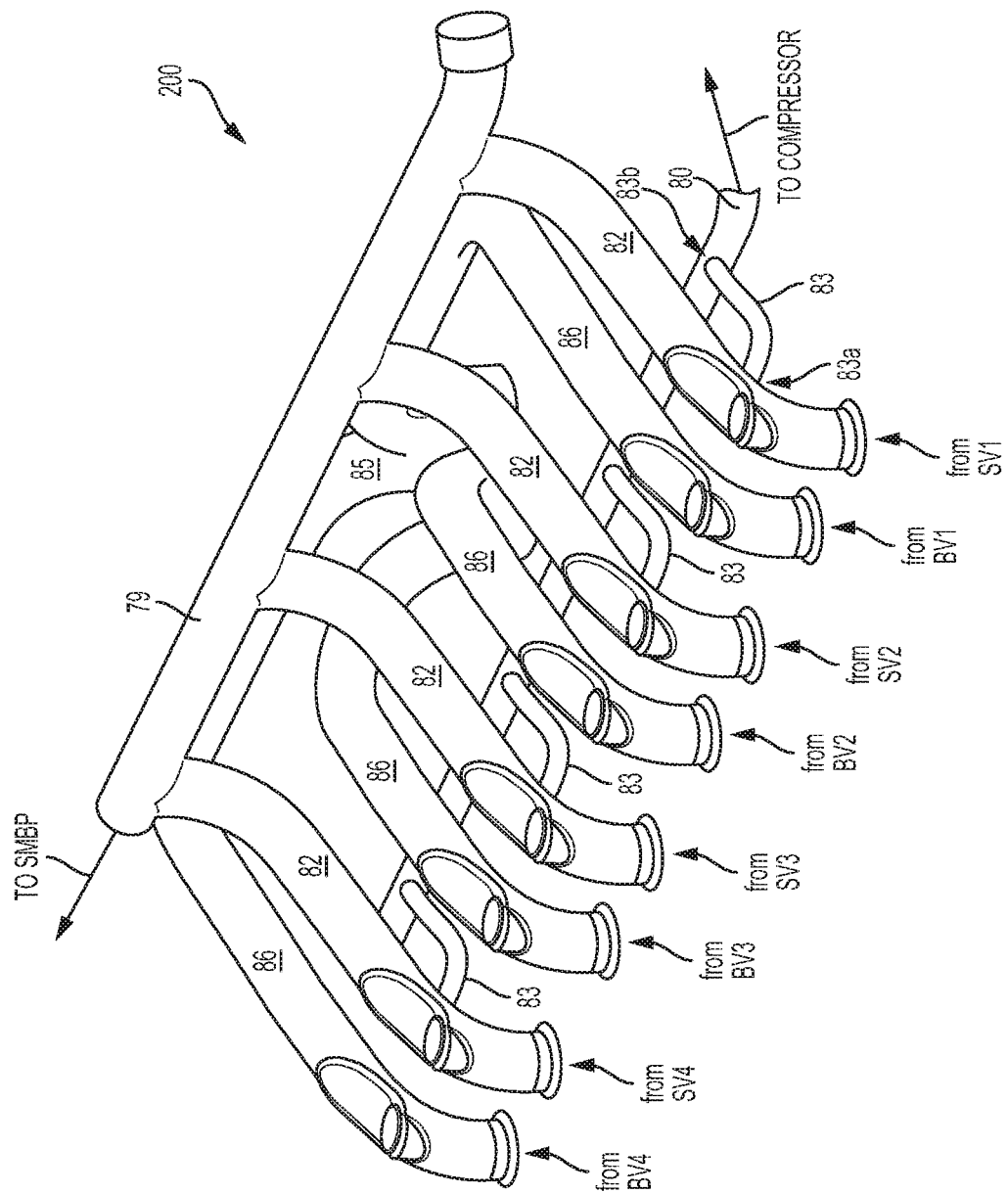
FIG. 2 shows an embodiment of a ported scavenge manifold for a split exhaust system.

Turning next to FIG. 2, a partial schematic of a split exhaust system 200 including a dual, ported scavenge manifold is shown. Split exhaust system 200 may be the split exhaust system of FIG. 1A, for example, and thus, like components are numbered the same and may not be reintroduced. As shown in FIG. 2 and described above with reference to FIG. 1A, first scavenge manifold 79 may receive exhaust gases and/or blowthrough air from the scavenge exhaust valves (e.g., scavenge exhaust valves, SVs, 6 of FIG. 1A) via second exhaust runners 82, and second scavenge manifold 80 may receive exhaust gases and/or blowthrough air from the scavenge exhaust valves via second exhaust runners 82 and ports 83. Thus, although first scavenge manifold 79 and second scavenge manifold 80 are not directly coupled, ports 83 and second exhaust runners 82 fluidically couple first scavenge manifold 79 and second scavenge manifold 80.

Further, blowdown manifold 84 (of which, second manifold portion 85 is shown in FIG. 2) may receive exhaust gases from blowdown exhaust valves (e.g., blowdown exhaust valves 8 of FIG. 1A) via first exhaust runners 86. As shown in FIG. 2, SV1 and BV1 correspond to the scavenge exhaust valve and blowdown exhaust valve, respectively, of a first cylinder, SV2 and BV2 correspond to the scavenge exhaust valve and blowdown exhaust valve, respectively, of a second cylinder, etc.

As shown in FIG. 2, the first scavenge manifold 79 and second scavenge manifold 80 are arranged substantially parallel with one another, but are spaced apart from one another. For example, as shown in the example orientation of FIG. 2, first scavenge manifold 79 and second scavenge manifold 80 may by arranged on opposites sides of exhaust runners 86, with first scavenge manifold 79 arranged above exhaust runners 86 and second scavenge manifold 80 arranged below exhaust runners 86. In this way, the first scavenge manifold 79 and second scavenge manifold 80 may be displaced from one another in a vertical direction and a lateral direction. Each exhaust runner 82 extends between and couples to each of a corresponding scavenge exhaust valve and the first scavenge manifold 79. Further, each port 83 extends between and couples to each of a corresponding exhaust runner 82 at a position along the exhaust runner 82 that is closer to the corresponding scavenge exhaust valve than the first scavenge manifold 79, and the second scavenge manifold 80. In one example, as shown in FIG. 2, each port 83 may be coupled to its corresponding exhaust runner 82 at a location on the exhaust runner 82 that is positioned between the corresponding scavenge exhaust valve and a mid-point of the exhaust runner 82.

An inlet (e.g., first end) 83a of each port 83 is directly coupled to one exhaust runner 82, proximate to a corresponding scavenge exhaust valve, whereas an outlet (e.g., second end) 83b of each port 83 is directly coupled to second scavenge manifold 80. The outlet of each port is spaced away from the outlets of adjacent ports so that the outlets of ports 83 are positioned and coupled along the length of second scavenge manifold 80. The diameter of each port 83, which may be constant throughout its length, is smaller than each of the diameters of exhaust runners 82, first scavenge manifold 79, and second scavenge manifold 80. Further, the diameter of second scavenge manifold 80 may be smaller than the diameter of first scavenge manifold 79. In one non-limiting example, the diameter of ports 83 may be approximately 9 mm, the diameter of first scavenge manifold 80 may be approximately 21 mm, and the diameter of second scavenge manifold 80 may be approximately 18 mm. In an alternate example, the diameter of ports 83 may be in a range of 8-10 mm, the diameter of first scavenge manifold 80 may be in a range of 20-22 mm, and the diameter of second scavenge manifold 80 may be in a range of 17-19 mm. The smaller diameter of ports 83 (and second scavenge manifold 80) may cause a first portion of gas (e.g., exhaust gases and blowthrough air) that flows through second exhaust runners 82 to first scavenge manifold 79 to be greater than a second, remaining portion of gas that flows through second exhaust runners 82 to second scavenge manifold 80 via ports 83. Thus, the smaller diameter of ports 83 may serve to restrict flow to second scavenge manifold 80 and thereby, to the compressor (e.g., compressor 162 of FIG. 1A). However, the relatively close position of the inlet of each port 83 to each scavenge exhaust valve along second exhaust runners 82 may result in blowthrough air preferentially flowing through ports 83 (and not to first scavenge manifold 79) due to a gas composition gradient within second exhaust gas runners 82, as will be further described below with reference to FIGS. 4 and 5. For example, the inlet of each port 83 is positioned closer to the scavenge exhaust valves than the coupling between second exhaust runners 82 and first scavenge manifold 79. Therefore, although the second portion of gas may be smaller in amount than the first portion of gas, it may contain a greater proportion of blowthrough air than the first portion of gas. Further, second scavenge manifold 80 may be arranged closer to the scavenge exhaust valves than first scavenge manifold 79. Due to the closer proximity of second scavenge manifold 80 to the scavenge valves relative to first scavenge manifold 79 and the smaller diameters of ports 83 and second scavenge manifold 80 relative to exhaust runners 82 and first scavenge manifold 79, respectively, ports 83 and second scavenge manifold 80 may hold a smaller volume of gas than exhaust runners 82 and first scavenge manifold 79.

FIG. 2 shows example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Now turning to FIG. 3, graph 300 depicts example valve timings with respect to a piston position for an engine cylinder comprising four valves: two intake valves and two exhaust valves, such as described above with reference to FIGS. 1A-1B. The example of FIG. 3 is drawn substantially to scale even though each and every point is not labeled with numerical values. As such, relative differences in timings can be estimated by the drawing dimensions. However, other relative timings may be used, if desired.

Continuing with FIG. 3, the cylinder is configured to receive intake air via two intake valves, exhaust a first blowdown portion of exhaust gas to a turbine inlet via a first exhaust valve (e.g., such as first, or blowdown, exhaust valves 8 shown in FIG. 1A), exhaust a second scavenging portion of exhaust gas to an intake passage via a second exhaust valve (e.g., such as second, or scavenge, exhaust valves 6 shown in FIG. 1A), and provide non-combusted blowthrough air to the intake passage via the second exhaust valve. By adjusting the timing of the opening and/or closing of the second exhaust valve with that of the two intake valves, residual exhaust gases in the cylinder clearance volume may be cleaned out and recirculated as EGR along with fresh intake blowthrough air. Further, under select conditions, such as when the turbine power is lower (e.g., during relatively low engine speed/high engine load) or when a compressor inlet temperature is higher (e.g., during relatively high engine speed/high engine load), the second scavenging portion may be directed to an exhaust passage, downstream of the turbine, via a scavenge manifold bypass passage while the blowthrough air is directed to the intake passage, as described further herein with respect to FIG. 6.

Graph 300 illustrates an engine position along the X-axis in crank angle degrees (CAD). Curve 302 depicts piston position (along the Y-axis) relative to top dead center (TDC) and/or bottom dead center (BDC) and the four strokes (intake, compression, power and exhaust) of an engine cycle. During the intake stroke, generally, the exhaust valves close and intake valves open. Air is introduced into the cylinder via the corresponding intake passage, and the cylinder piston moves to the bottom of the cylinder so as to increase the volume within the cylinder. The position at which the piston is near the bottom of the cylinder and at the end of its stroke (e.g. when the combustion chamber is at its largest volume) is typically referred to by those of skill in the art as bottom dead center (BDC). During the compression stroke, the intake valves and exhaust valves are closed. The piston moves toward the cylinder head so as to compress the air within combustion chamber. The point at which the piston is at the end of its stroke and closest to the cylinder head (e.g. when the combustion chamber is at its smallest volume) is typically referred to by those of skill in the art as top dead center (TDC). In a process herein referred to as injection, fuel is introduced into the combustion chamber. In a process herein referred to as ignition, the injected fuel is ignited by known ignition means, such as a spark plug, resulting in combustion. During the expansion stroke, the expanding gases push the piston back to BDC. A crankshaft converts this piston movement into a rotational torque of the rotary shaft. During the exhaust stroke, in a traditional design, exhaust valves are opened to release the residual combusted air-fuel mixture to the corresponding exhaust passages, and the piston returns to TDC. In this description, the second exhaust (scavenge) valves may be opened after the beginning of the exhaust stroke and stay open until after the end of the exhaust stroke while the first exhaust (blowdown) valves are closed and the intake valves are opened to flush out residual exhaust gases with blowthrough air.

Curve 304 depicts a first intake valve timing, lift, and duration for a first intake valve (Int_1), while curve 306 depicts a second intake valve timing, lift, and duration for a second intake valve (Int_2), both intake valves coupled to the intake passage of the engine cylinder. Curve 308 depicts an example exhaust valve timing, lift, and duration for a first exhaust valve (Exh_1, which may correspond to first, or blowdown, exhaust valves 8 shown in FIG. 1A) coupled to a first exhaust manifold (e.g., blowdown exhaust manifold 84 shown in FIG. 1A) of the engine cylinder via a first exhaust runner (e.g. first exhaust runner 86 of FIG. 1A), while curve 310 depicts an example exhaust valve timing, lift, and duration for a second exhaust valve (Exh_2, which may correspond to second, or scavenge, exhaust valves 6 shown in FIG. 1A) coupled to a first scavenge manifold and second scavenge manifold (e.g., first scavenge manifold 79 and second scavenge manifold 80 shown in FIG. 1A) of the engine cylinder via a second exhaust runner (e.g., second exhaust runner 82 of FIG. 1A). As previously elaborated, the first exhaust manifold connects the first exhaust valve to the inlet of a turbine in a turbocharger, and the first scavenge manifold connects the second exhaust valve to an exhaust passage downstream of the turbocharger turbine. A port (e.g., port 83 shown in FIG. 1A) in the second exhaust runner connects the second exhaust valve to an intake passage via a second scavenge manifold (e.g., second scavenge manifold 80 of FIG. 1A) and an EGR passage. The first exhaust manifold may be separate from the first and second scavenge manifolds, and the first scavenge manifold and the second scavenge manifold may be fluidically coupled by the port, as explained above.

In the depicted example, the first and second intake valves are fully opened from a closed position at a common timing (curves 304 and 306), beginning near intake stroke TDC just after CAD2 (e.g., at or just after intake stroke TDC), and are closed after a subsequent compression stroke has commenced past CAD3 (e.g., after BDC). Additionally, when opened fully, the two intake valves may be opened with the same amount of valve lift L1 for the same duration of D1. In other examples, the two valves may be operated with a different timing by adjusting the phasing, lift, or duration based on engine conditions.

Now turning to the exhaust valves, the timing of the first exhaust valve opening and closing relative to the second exhaust valve opening and closing is staggered. Specifically, the first exhaust valve is opened from a closed position at a first timing (curve 308) that is earlier in the engine cycle than the timing (curve 310) at which the second exhaust valve is opened from a closed position. Specifically, the first timing for opening the first exhaust valve is between TDC and BDC of the power stroke, before CAD1 (e.g., before exhaust stroke BDC), while the timing for opening the second exhaust valve is just after exhaust stroke BDC, after CAD1 but before CAD2. The first exhaust valve (curve 308) is closed before the end of the exhaust stroke, and the second exhaust valve (curve 310) is closed after the end of the exhaust stroke. Thus, the second exhaust valve remains open to overlap slightly with opening of the intake valves.

To elaborate, the first exhaust valve (curve 308) may be fully opened from close before the start of an exhaust stroke (e.g., between 90 and 40 degrees before BDC), maintained fully open through a first part of the exhaust stroke, and may be fully closed before the exhaust stroke ends (e.g., between 50 and 0 degrees before TDC) to collect the blowdown portion of the exhaust pulse. The second exhaust valve (curve 310) may be fully opened from a closed position just after the beginning of the exhaust stroke (e.g., between 40 and 90 degrees past BDC), maintained open through a second portion of the exhaust stroke, and may be fully closed after the intake stroke begins (e.g., between 20 and 70 degrees after TDC) to exhaust the scavenging portion of the exhaust. Additionally, the second exhaust valve and the intake valves, as shown in FIG. 3, may have a positive overlap phase (e.g., from between 20 degrees before TDC and 40 degrees after TDC until between 40 and 90 degrees past TDC) to allow blowthrough with EGR. This cycle, wherein all four valves are operational, may repeat itself based on engine operating conditions, as described further below with reference to FIG. 6.

Additionally, the first exhaust valve (curve 308) may be opened with a first amount of valve lift L2, while the second exhaust valve may be opened with a second amount of valve lift L3 (curve 310), where L3 is smaller than L2. Further still, the first exhaust valve may be opened at the first timing for a duration D2, while the second exhaust valve may be opened for a duration D3, where D3 is smaller than D2. It will be appreciated that in alternate embodiments, the two exhaust valves may have the same amount of valve lift and/or same duration of opening while opening at differently phased timings.

In this way, by using staggered valve timings, engine efficiency and power can be increased by separating exhaust gases released at higher pressure (e.g., expanding blowdown exhaust gases in the cylinder) from residual exhaust gases at low pressure (e.g., exhaust gases that remain in the cylinder after blowdown) into the different manifolds. By conveying low pressure residual exhaust gases as EGR along with blowthrough air to the compressor inlet (via the EGR passage and the second scavenge manifold), combustion chamber temperatures can be lowered, thereby reducing an occurrence of knock and an amount of spark retard from maximum torque timing. Further, since the exhaust gases at the end of the stroke are directed to either downstream of the turbine or upstream of the compressor, which are both at lower pressures, exhaust pumping losses can be minimized to increase engine efficiency.

Thus, exhaust gases can be used more efficiently than simply directing all the exhaust gas of a cylinder through a single, common exhaust port to a turbocharger turbine. As such, several advantages may be achieved. For example, the average exhaust gas pressure supplied to the turbocharger can be increased by separating and directing the blowdown pulse into the turbine inlet to increase turbocharger output. Additionally, fuel economy may be increased because blowthrough air is not routed to the catalyst, being directed to the compressor inlet instead, and therefore, excess fuel may not be injected into the exhaust gases to maintain a stoichiometric ratio.

Turning now to FIG. 4, a graph 400 demonstrating how relative gas composition in an exhaust runner (e.g., second exhaust runner 82 shown in FIG. 2), coupled to a cylinder via a scavenge exhaust valve (e.g., second exhaust valve 6 of FIG. 1A), varies based on distance from the scavenge exhaust valve (SV) and engine position is shown. The X-axis represents the distance from the SV, with distance increasing from left to right. A location of a port (e.g., port 83 of FIG. 1A and FIG. 2) coupling the exhaust runner to a second scavenge manifold (e.g., second scavenge manifold 80 of FIG. 1A and FIG. 2) is noted with an arrow, as is the direction to a scavenge manifold bypass passage (SMBP 98 of FIG. 1A) via a first scavenge manifold (e.g., first scavenge manifold 79 of FIG. 1A). The Y-axis represents the relative gas composition in the exhaust runner at each engine position, which is noted as crank angle degrees after TDC (ATDC) of the intake stroke of the cylinder. The relative gas composition ranges from burnt gas (e.g., combusted exhaust gases) to fresh air (or a mixture of fresh air and unburnt fuel), with dotted line 418 representing a 1:1 mixture of burnt gas and fresh air. Thus, gas above dotted line 418 has more fresh air than burnt gas, with the amount of fresh air increasing up the Y-axis (e.g., in the direction of the arrow), and gas below dotted line 418 has more burnt gas than fresh air, with the amount of burnt gas increasing down the Y-axis.

At −110 deg ATDC intake (e.g., 110 crank angle degrees before TDC of the intake stroke of the cylinder, during the exhaust stroke), as shown in plot 402, the exhaust runner contains burnt gas throughout its length. With the SV closed prior to −110 deg ATDC, the burnt gas may be from a previous combustion event. At −110 deg ATDC, the SV opens (for representative valve timings, see FIG. 5) and an intake valve (or valves) remains closed; thus, fresh air does not enter the cylinder, and residual burnt gas from the combustion event (e.g., a scavenging portion) may begin to exhaust through the SV and into the exhaust runner.

At −70 deg ATDC intake (e.g., 70 crank angle degrees before TDC of the intake stroke, also during the exhaust stroke), the SV remains open and the intake valve remains closed. The scavenging portion of exhaust continues to flow through the SV and into the exhaust runner, resulting in entirely burnt gas in the exhaust runner (plot 404). Depending on a position of a SMBV in the SMBP and a BTCC valve in an EGR passage (e.g., first EGR valve 54 in first EGR passage 50 of FIG. 1A), the burnt gas may flow from the exhaust runner to the SMBP via the first scavenge manifold and/or to a compressor inlet via the port, the second scavenge manifold, and the EGR passage. For example, when the SMBV is closed and the BTCC valve is open, the scavenging portion may be flowed to the compressor inlet as EGR and not to an exhaust passage via the SMBP. In another example, when the SMBV is open and the BTCC valve is closed, the scavenging portion may be flowed to the exhaust passage via the SMBP and not to the compressor inlet. In still another example, when the SMBV and the BTCC valve are both (at least partially) open, a first portion of the scavenging portion may be flowed to the exhaust passage via the SMBP, and a second portion of the scavenging portion may be flowed to the compressor inlet via the port and the EGR passage. However, in this example, the first portion may be greater than the second portion since the ports of the ported scavenge manifold have a smaller diameter than the exhaust runners, as explained above with reference to FIG. 2.

At −30 deg ATDC intake, the intake valve opens. Fresh air begins to enter the cylinder, but it has not yet reached the SV, which remains open. Thus, the gas composition (plot 406) in the exhaust runner remains burnt gas from the scavenging portion of exhaust as well as combusted gas from previous combustion events, such as due to backflow, as will be further described below.

At 10 deg ATDC (plot 408), both the intake valve and the SV remain open. Thus, strong blowthrough is present, with fresh air flowing to the exhaust runner through the intake valve and the SV. For example, at 10 deg ATDC, the intake valve and SV may have maximum overlap, such as illustrated in the example of FIG. 5. The fresh blowthrough air pushes the burnt gas further along the exhaust runner toward the SMBV. The composition of gas within the exhaust runner becomes a gradient between burnt gas at the far end (e.g., towards the SMBP) and fresh air at the SV, as shown in plot 408. The shorter the distance from the SV, the greater the proportion of fresh air in the exhaust runner. At the location of the port, the gas is almost entirely comprised of fresh air. Thus, fresh air may primarily flow through the port to the second scavenge manifold (and then to the inlet of the compressor), while burnt gas may primarily flow to the SMBP via the first scavenge manifold.

By 180 deg ATDC (plot 410), the gradient of fresh air and burnt gas has shifted so that the composition of gas in the exhaust runner transitions through dotted line 418 (representing equal parts fresh air and burnt gas) at a greater distance from the SV than at 10 deg ATDC (plot 408). However, although the intake valve remains open, the SV is closed at 180 deg ATDC. Therefore, fresh air no longer flows from the SV to the exhaust runner. As shown in plot 410, the gas composition may be entirely fresh air at the port to the second scavenge manifold. Gas (e.g., fresh air, burnt gas, or a mixture thereof) may flow between the exhaust runner and the compressor inlet (via the port and the second scavenge manifold) and the exhaust runner and the exhaust passage (via the first scavenge manifold and the SMPB) based on the pressures at the exhaust runner, the compressor inlet, and the exhaust passage. For example, if the SMBV is open and the pressure in the exhaust passage is higher than the pressure in the exhaust runner, burnt gas may backflow from the exhaust passage, through the SMBP, and to the exhaust runner via the first scavenge manifold. This backflow may shift the gas composition gradient back toward the (closed) SV, as shown in plot 412 (270 deg ATDC intake). Further, the pressure at the compressor inlet may be lower than the pressure in the exhaust passage, allowing fresh air at the port to flow from the exhaust runner to the second scavenge manifold and through the EGR passage to the compressor inlet when the BTCC valve is open.

At 360 deg ATDC (plot 414), with both the SMBV and BTCC valve at least partially open, exhaust backflow through the SMBP and fresh air consumption by the compressor further shifts the gas gradient toward the (closed) SV and the port. At −270 deg ATDC (plot 416), which is 270 crank angle degrees before TDC of the intake stroke of the next engine cycle, the gradient between fresh air and burnt gas becomes steeper than at 360 deg ATDC (plot 414), with the transition between primarily fresh air and primarily burnt gas occurring closer to the port. By −110 deg ATDC, all of the fresh air has been consumed by the compressor, leaving burnt gas in the exhaust runner (plot 402).

Note that the engine positions given in the example of FIG. 4 are exemplary in nature. In other examples, such as when the timings of the SV and the intake valve(s) are different, the gas composition at a given engine position may be different (e.g., shifted).

While FIG. 4 provides the relative gas composition within the exhaust runner (and at the port to the second scavenge manifold) for several example engine positions of interest, FIG. 5 is an example graph 500 showing how the gas composition at the port (e.g., inlet of port 83 where the exhaust runner and the port are joined) changes based on crank angle. Continuing to FIG. 5, piston position is shown in plot 502 (similar to curve 302 of FIG. 3), relative gas composition at the port is shown in plot 504, cylinder pressure is shown in plot 505, exhaust passage pressure is shown in plot 506 (e.g., a pressure in exhaust passage 74 shown in FIG. 1A), a pressure of a first exhaust runner is shown in dot-dashed plot 507, a pressure of a second exhaust runner is shown in solid line plot 508, compressor inlet pressure is shown in plot 510, blowdown exhaust valve (BV) lift is shown in plot 512, SV lift is shown in plot 514, and intake valve lift is shown in plot 516. For all of the above, the X-axis represents crank angle, in degrees ATDC. The Y-axis represents the labeled parameter, with values increasing from top to bottom except for plot 504, in which the Y-axis ranges from burnt gas to fresh air, as labeled. The exhaust passage pressure (plot 506) refers to the pressure of the exhaust passage downstream of a first catalyst and upstream of a second catalyst (e.g., as measured by pressure sensor 96 of FIG. 1A), the first exhaust runner pressure (plot 507) refers to the pressure within the exhaust runner coupling the BV to a blowdown exhaust manifold (e.g., exhaust runner 86 shown in FIG. 1A and FIG. 2), and the second exhaust runner pressure (plot 508) refers to the pressure within the exhaust runner coupling the SV to the first scavenge manifold (e.g., exhaust runner 82 shown in FIG. 1A and FIG. 2). As described with respect to dotted line 418 of FIG. 4, dotted line 518 of FIG. 5 represents a 1:1 mixture of burnt gas and fresh air.

Graph 500 shows a single engine cycle (plot 502) for a first cylinder of a multi-cylinder engine system, such as the engine system shown in FIG. 1A, and corresponding example timings for intake (plot 516) and exhaust valves (plots 512 and plot 514) coupled to the first cylinder. However, during the single engine cycle of the first cylinder, other cylinders of the multi-cylinder engine system are also undergoing combustion, which includes exhausting combusted gas at staggered timings compared to the first cylinder of graph 500. This results in pulses of higher exhaust pressure in the first exhaust runner (plot 507) throughout the engine cycle of the first cylinder. For example, first exhaust runner pressure (plot 507) increases when the BV opens (plot 512) between −270 and −180 deg ATDC as the higher pressure cylinder (plot 505) empties into the blowdown exhaust manifold (note that the cylinder pressure plot has been clipped due to the high magnitude of the cylinder pressure relative to the other pressure plots). Further, with the SMBV open, the exhaust runner is in fluidic communication with the exhaust passage (via the SMBP and the first exhaust manifold) as well as exhaust runners coupled SVs of the other cylinders (via the first exhaust manifold). Therefore, the second exhaust runner also experiences pressure pulses (plot 508), although they are smaller in magnitude than the pulses experience in the first exhaust runner (plot 507). On the other hand, the compressor inlet pressure (plot 510) remains relatively constant and lower than the exhaust pressure. As a result, gas may backflow from the exhaust passage, through the SMBP to the first scavenge manifold, to the exhaust runner, through the port to the second scavenge manifold, and to the compressor inlet via the EGR passage.

The backflow of exhaust from the exhaust passage to the first scavenge manifold and the flow of gas (EGR and blowthrough air) from the second scavenge manifold to the compressor inlet leads to a gradual change in the relative gas composition at the port (plot 504) while the SV is closed (e.g., between 70 deg ATDC and −110 deg ATDC of the subsequent engine cycle). For example, after the SV closes during the intake stroke (e.g., at 70 deg ATDC), there is primarily fresh air at the port. The relative amount of fresh air in the gas at the port decreases (and the relative amount of burnt gas at the port increases) throughout the compression stroke (e.g., 180 to 360 deg ATDC) and power stroke (e.g., −360 to −180 deg ATDC of the subsequent engine cycle). Before the SV opens during the exhaust stroke, the port may contain burnt gas with little to no fresh air. When the SV opens (e.g., at −110 deg ATDC), the scavenging portion of the exhaust exits the SV to the exhaust runner. Thus, the composition at the port remains burnt gas until the intake valve opens (e.g., at −30 deg ATDC) and fresh blowthrough air rapidly replaces burnt gas at the port.

Taken together, graphs 400 of FIG. 4 and 500 of FIG. 5 illustrate how the gas composition gradient in the exhaust runner and the position of the port to the second scavenge manifold facilitate the flow of primarily fresh air through the port and primarily burnt gas through the SMBP. Thus, blowthrough air may be provided to the compressor inlet and not to the exhaust passage, as fresh air may degrade the ability of the downstream catalyst to reduce NOx. In particular, it may be beneficial to selectively flow blowthrough air to the compressor inlet and burnt gas to the exhaust passage instead of flowing both EGR and blowthrough to the compressor inlet under restricted compressor flow conditions, as further described below.

Figure 6:
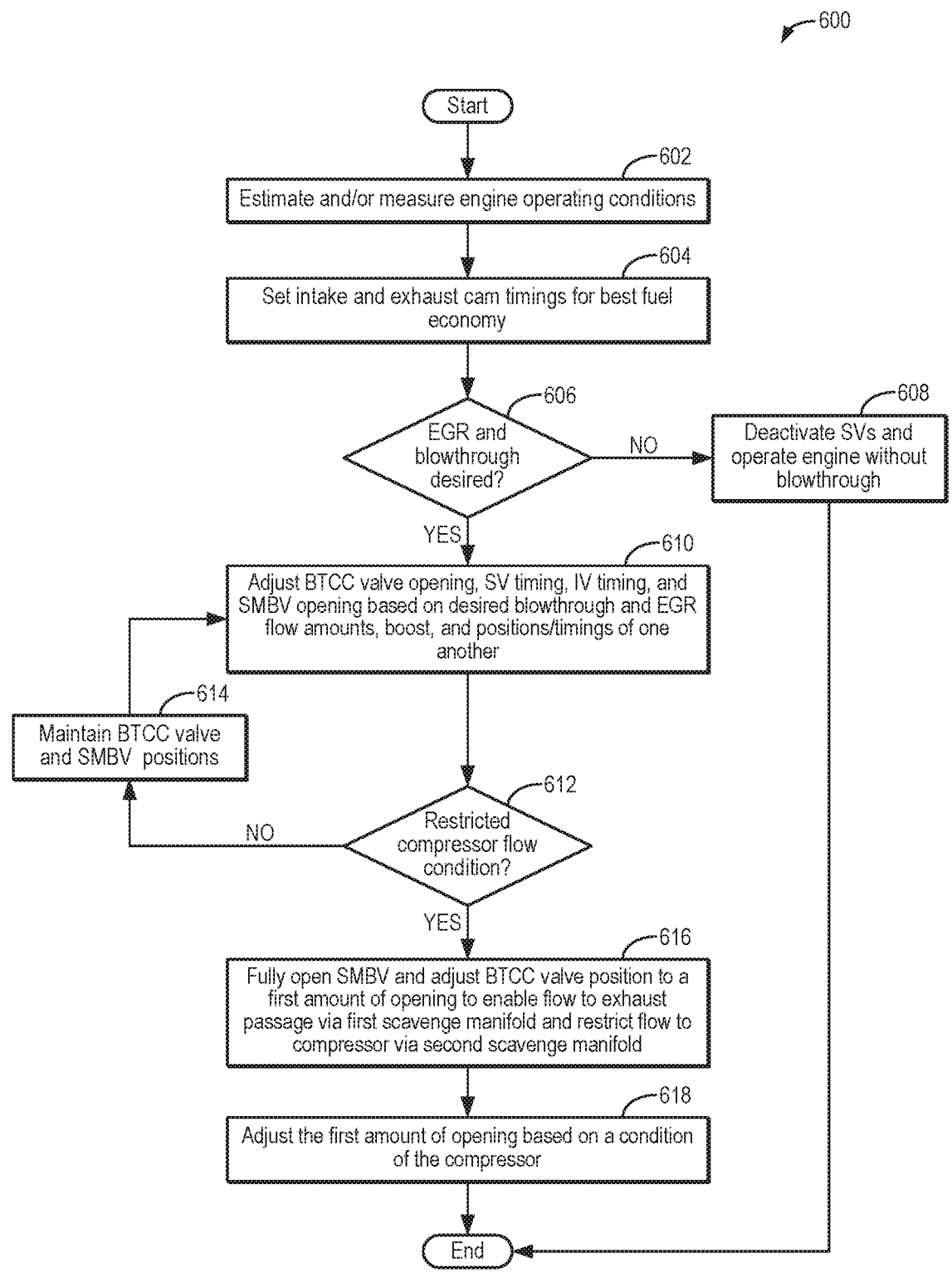
FIG. 6 is an example method for adjusting valve positions to supply residual exhaust gas to an exhaust passage via a first scavenge manifold and blowthrough air to an inlet of a compressor via a second scavenge manifold during restricted compressor flow conditions.
Figure 7:
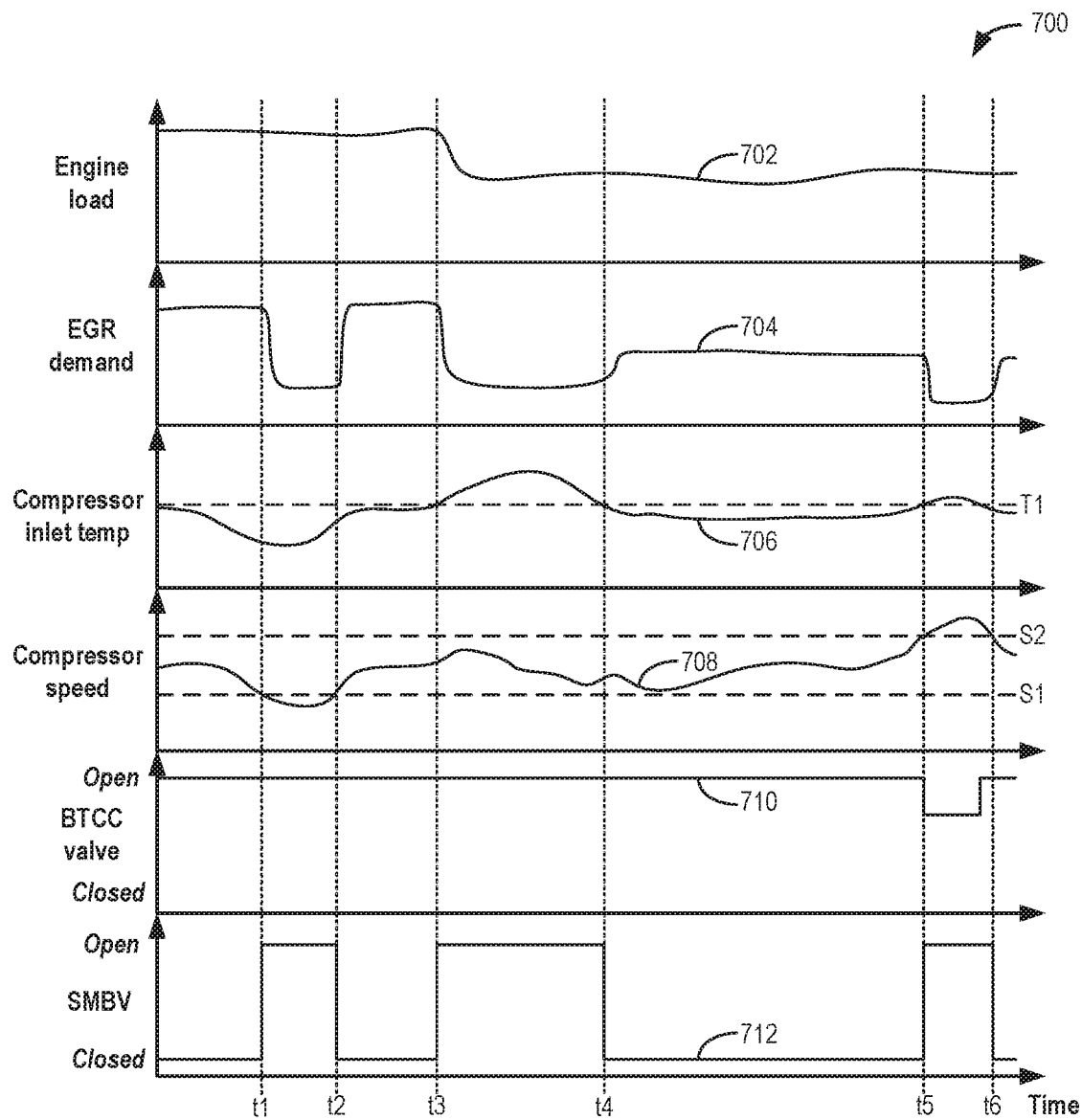
FIG. 7 shows an example graph of changes in engine operating parameters while operating the split exhaust engine system during restricted compressor flow conditions.

FIG. 6 shows an example method 600 for adjusting an opening of a BTCC valve disposed within an EGR passage (e.g., BTCC valve 54 of FIG. 1A) and an opening of a SMBV (e.g., SMBV 97 of FIG. 1A) when restricted flow from the EGR passage is desired to a compressor of a turbocharger. Instructions for carrying out method 600 and the rest of the methods included herein may be executed by a controller (e.g., controller 12 of FIG. 1A) based on instructions stored on a memory of the controller and in conjunction with signals received from sensors of the engine system, such as the sensors described above with reference to FIGS. 1A-1B (e.g., intake temperature sensor 33 of FIG. 1A). The controller may employ engine actuators of the engine system (e.g., the BTCC valve, the SMBV) to adjust engine operation according to the methods described below.

Method 600 begins at 602 and includes estimating and/or measuring engine operating conditions. Engine operating conditions may include a brake pedal position; acceleration pedal position; operator torque demand; ambient temperature and humidity; barometric pressure; engine speed; engine load; engine temperature; mass air flow (MAF); intake manifold pressure (MAP); oxygen content of intake air/exhaust gases at various points in the engine system; a timing of the cylinder intake and exhaust valves; positions of various valves of the engine system; a temperature and/or loading level of one or more emission control devices; pressures in the exhaust manifolds, exhaust runners, exhaust passage and/or intake passage; an amount of fuel being injected into engine cylinders; a speed of the turbocharger; condensate formation at the turbocharger compressor; a temperature at the turbocharger compressor inlet and/or outlet; etc.

At 604, method 600 includes setting an intake cam timing of intake valves (e.g., intake valves 2 and 4 of FIG. 1A) and an exhaust cam timing of scavenge exhaust valves (e.g., second exhaust valves 6 of FIG. 1A) and blowdown exhaust valves (e.g., first exhaust valves 8 of FIG. 1A) for best fuel economy. For example, the timing of the exhaust valves and intake valves may be set for the best achievable brake specific fuel consumption (BSFC) at the current engine operating conditions. In one example, this may include setting the timing of the scavenge exhaust valve, blowdown exhaust valve, and intake valve of each cylinder at the timings shown in FIG. 3, as described above. In some embodiments, the timing of the exhaust valves and intake valves may be adjusted slightly from the timings shown in FIG. 3 based on engine speed and load. For example, the intake timing may be adjusted to full retard at lighter engine loads and advanced when the engine is boost-limited or there is a request for increased blowthrough to reduce knock. In another embodiment, exhaust valve timing may be adjusted so that the exhaust valves open earlier as engine speed increases. The exhaust valve timing may then be retarded as boost decreases (e.g., at low engine speed and high engine load conditions) or when engine speed is high and the EGR temperature is greater than a threshold temperature.

At 606, it is determined if EGR and blowthrough combustion cooling (BTCC) is desired or currently enabled. EGR and blowthrough may be delivered to an intake passage of the engine upstream of the turbocharger compressor via a second scavenge exhaust manifold (e.g., via second scavenge manifold 80 and first EGR passage 50 shown in FIG. 1A). For example, if engine load is above a threshold load, EGR and blowthrough to the intake passage may be desired and enabled. In another example, if the BTCC hardware of the engine (e.g., the BTCC valve and/or the scavenge exhaust valves) is activated, then EGR and blowthrough may be enabled. For example, it may be determined that the BTCC hardware is activated if the scavenge exhaust valves are operating (e.g., not deactivated) and the BTCC valve is open or at least partially open.

If BTCC is not desired, such as when the engine load is below the threshold load, the method continues to 608 to deactivate the scavenge exhaust valves and operate the engine without blowthrough. For example, this may include maintaining the scavenge exhaust valves closed and routing exhaust gases from the engine cylinders to only the exhaust passage via the blowdown exhaust valves. As one example, the controller may send a deactivation signal to the valve actuators of the scavenge valves (e.g., exhaust valve timing actuator 103 shown in FIG. 1B) to deactivate the SVs of every cylinder. Further, the method at 608 may include operating the engine without external EGR. The method then ends.

If EGR and blowthrough are desired and/or the BTCC hardware is already activated at 606, the method continues to 610 and includes adjusting BTCC valve opening (e.g., adjusting a position of the BTCC valve), scavenge exhaust valve (SV) timing, intake valve (IV) timing, and/or SMBV opening (e.g., adjusting a position of the SMBV) based on desired blowthrough and EGR flow amounts, boost level (e.g., boost pressure downstream of turbocharger compressor), and current positions and timings of each of the above-listed valves. As one example, the BTCC valve may be opened in response to the engine being boosted (e.g., with the turbocharger compressor operating and resulting in MAP greater than atmospheric pressure). As another example, if more of less EGR flow or blowthrough to the intake passage via the second scavenge manifold and EGR passage is desired relative to currently estimated levels (e.g., as estimated based on an output of a pressure sensor and/or oxygen sensor positioned in the first and/or second scavenge manifolds), the controller may adjust the positions or timings of one or more of the BTCC valve, SV, IV, and SMBV to achieve the desired EGR flow and blowthrough flow. For example, if increased EGR is desired, the controller may increasing the opening of the BTCC valve, advance SV timing, and/or decrease the opening of the SMBV. If instead decreased EGR is desired, the controller may reduce the opening of the BTCC valve, retard SV timing, and/or increase the opening of the SMBV. As another example, if increased blowthrough is desired, the controller may retard SV timing, advance IV timing, reduce the opening of the SMBV, and/or increase the opening of the BTCC valve. If decreased blowthrough is desired, the controller may advance SV timing, retard IV timing, increase the opening of the SMBV, and/or decrease the opening of the BTCC valve. Further, adjusting the valve positions and timings at 610 may include adjusting the valve positions and/or timings relative to the positions and timings of one another.

In another example of the method at 610, the scavenge manifold pressure at certain SV timings may change the control of the BTCC valve, SMBV, and/or intake valve. For example, if the BTCC valve is closed and a desired scavenge manifold pressure is lower than the currently measured scavenge manifold pressure, the method at 610 may include opening or increasing the amount of opening of the SMBV to decrease the scavenge manifold pressure. As another example, the SV timing may be adjusted based on the measured scavenge manifold pressure. In one example, in response to the measured scavenge manifold pressure being greater than the desired scavenge manifold pressure, the method may include retarding the SV timing to decrease the scavenge manifold pressure. The desired scavenge manifold pressure may be determined based on (e.g., as a function of) one or more of intake manifold pressure, exhaust pressure, and/or boost conditions (e.g., whether the engine is boosted or not). Further, in response to adjusting the SV timing based on the measured pressure and in response to the scavenge manifold pressure, the positions of the BTCC valve and/or SMBV may be adjusted. For example, after adjusting the SV timing, the position of the SMBV may be adjusted to maintain the scavenge manifold pressure at the desired scavenge manifold pressure (based on engine operating conditions), and the position of the BTCC valve may be adjusted to maintain EGR flow at a desired EGR flow (e.g., based on engine operating conditions such as engine load, knock, and compressor operating conditions such as temperature and speed).

The above described valve adjustments performed at 610 may be described as a baseline EGR and BTCC mode. However, other modes may be selected based on engine operating conditions. For example, a restricted compressor flow mode may be selected if one or more restricted compressor flow conditions are present, such as one or more operational thresholds being met. Therefore, at 612, method 600 includes determining if restricted compressor flow conditions are met. Restricted compressor flow conditions may result in a request to reduce the amount of EGR flow to the compressor inlet. Restricted compressor flow conditions may include lower turbine power, where turbine power is lower than a lower threshold (such as may occur during relatively low engine speed/high load conditions), and higher compressor inlet temperature, where compressor inlet temperature is greater than an upper threshold (such as may occur during relatively high engine speed/high load conditions). For example, lower turbine power may refer to a speed of the turbocharger (such as the speed of the compressor and/or turbine of the turbocharger) being less than or equal to a first, lower threshold speed. Higher compressor inlet temperature may refer to the temperature of the compressor inlet being greater than or equal to an upper threshold inlet temperature, where the upper threshold inlet temperature may be based on a temperature above which degradation of one of more compressor components may occur. Further, restricted compressor flow conditions may be present when the speed of the turbocharger compressor is greater than or equal to a second, higher threshold speed that may be based on a speed above which degradation of the compressor wheel may occur. Restricted compressor flow conditions, or a request for reduced EGR at the compressor inlet, may also occur when condensate formation at the compressor is above a threshold level (e.g., amount or rate of condensate formation).

If restricted compressor flow conditions are not met, such as when the speed of the turbocharger compressor is greater than the first, lower threshold speed and less than the second, higher threshold speed and the compressor inlet temperature is less than the threshold temperature, method 600 proceeds to 614 and includes maintaining the BTCC valve and SMBV positions at their current positions (e.g., amount of openings). Further, the method may repeat to 610 to continue adjusting the BTCC valve openings, SV timing, IV timing, and SMBV opening based on the desired blowthrough and EGR flow amounts, boost level, and current positions and timings of each of the above-listed valves, as described above. Thus, the engine may continue to be operated in the baseline EGR and BTCC mode.

Alternatively, if one or more restricted compressor flow conditions are met at 612, method 600 proceeds to 616 and includes fully opening the SMBV and adjusting the BTCC valve position to a first amount of opening to enable flow to the exhaust passage via the first scavenge manifold and restrict exhaust gas flow to the compressor via the second scavenge manifold. For example, the SMBV may be fully opened from a closed or partially closed position, and the BTCC valve may be adjusted to the first amount of opening which may include a fully open position or a partially open position. Thus, if the BTCC valve is already fully open, the method at 616 may include maintaining the BTCC valve fully open or partially closing the BTCC valve to the first amount of opening. The first amount of opening is greater than 0% open such that the BTCC valve is at least partially open at 616. With the SMBV fully open and the BTCC valve fully or partially open (e.g., at the first amount of opening), an overall amount of flow to the compressor inlet may be reduced. Further, as described above with respect to FIG. 2 and FIGS. 4-5, due to the location of a port (e.g., port 83 of FIG. 1A) coupling the second scavenge manifold to an exhaust runner coupled to the SV, blowthrough air flows through the port to the second scavenge manifold and to the compressor inlet via the EGR passage while burnt gas flows through the first scavenge manifold and to the exhaust passage via the SMBP. In this way, the method at 616 includes flowing a first portion of exhaust gases to the exhaust passage, upstream of the turbocharger turbine, via the blowdown exhaust valves and from the scavenge exhaust valves, first flowing a second portion of exhaust gases (e.g., hotter combusted exhaust gases) to the exhaust passage, downstream of the turbocharger turbine and upstream of a catalyst and, then, flowing blowthrough air (e.g., cooler fresh air) to the intake passage, upstream of the turbocharger compressor. The blowthrough air without EGR may help reduce the temperature at the compressor inlet, which may be particularly beneficial when the restricted compressor flow mode is entered due to the compressor inlet temperature being greater than the threshold temperature. Further, catalyst degradation is prevented by directing the blowthrough air to the compressor inlet and not to the exhaust passage, upstream of the catalyst (e.g., second emission control device 72 of FIG. 1A), as may occur if the BTCC valve were fully closed while the SMBV is open. Further still, with the SMBV fully open and the BTCC valve at least partially open, scavenge manifold pressurization is reduced and/or avoided.

At 618, method 600 includes adjusting the first amount of opening based on a condition of the compressor. For example, if both the compressor inlet temperature is greater than or equal to the first threshold temperature and the compressor speed is greater than the second, higher threshold speed, the first amount of opening of the BTCC valve may be decreased to further restrict flow to the compressor and further reduce compressor flow. In another example, as the compressor speed increases further above the second, higher threshold speed, the first amount of opening of the BTCC valve may be further decreased. In yet another example, the first amount of opening of the BTCC valve may be increased from a partially open position as the compressor inlet temperature decreases and/or as the compressor speed decreases. In this way, increased blowthrough air (containing fresh air and/or unburnt fuel) may be directed to the compressor inlet instead of the exhaust passage via the SMBV. Further, turbocharger speed may be decreased by opening (or increasing the opening of) a turbocharger wastegate, such as by actuating a turbocharger wastegate valve to a further open position (e.g., wastegate valve 76 of FIG. 1A). Following 618, method 600 ends.

FIG. 7 shows a graph 700 of adjusting BTCC valve and SMBV positions when switching between a baseline EGR and BTCC mode and a restricted compressor flow mode, such as the modes described above with respect to FIG. 6, responsive to restricted compressor flow conditions being met. Specifically, graph 700 depicts engine load at plot 702, EGR demand (e.g., desired EGR flow to the intake passage) at plot 704, compressor inlet temperature at plot 706, compressor (e.g., turbocharger) speed at plot 708, a position of the BTCC valve at plot 710, and a position of the SMBV at plot 712. For all of the above, the X-axis represents time, with time increasing from left to right. The Y-axis of each plot represents the labeled parameter, with values increasing from bottom to top except for plots 710 and 712, in which valve position ranges from fully closed ("closed") to fully open ("open").

Prior to time t1, the compressor inlet temperature (plot 706) is below a threshold temperature T1 and the compressor speed (plot 708) is between a first, lower threshold speed S1 and a second, higher threshold speed S2. As described above with respect to FIG. 6, such conditions enable the engine to be operated in the baseline EGR and BTCC mode. Thus, the BTCC valve is open (plot 710) to enable EGR flow and blowthrough to the compressor inlet while the SMBV is maintained closed (plot 712) to prevent the flow of EGR and blowthrough to the exhaust. Although not shown in the example of graph 700, it should be understood that the SV valves are activated. Further, the intake and exhaust valve timings may be adjusted based on the amount of EGR desired, such as the EGR demand shown in plot 704, and may be at their default timings for best fuel economy. Additionally, the engine load (plot 702) is relatively high.

At time t1, the compressor speed (plot 708) drops below the first, lower threshold speed S1. For example, with the engine load remaining relatively high (plot 702), there may be a decrease in engine speed that results in low turbine power. Responsive to the compressor speed dropping below the first, lower threshold speed S1, the engine system is switched to operating in the restricted compressor flow mode and EGR demand decreases (e.g., the amount of EGR flow requested at the compressor inlet decreases). Thus, the SMBV is fully opened (plot 712), and the BTCC valve is maintained fully open. As described above, operating with the SMBV fully open and the BTCC valve with the first amount of opening (fully open in this example) reduces flow to the compressor while preventing the scavenge manifolds from becoming pressurized. Further, fresh blowthrough air is preferentially flowed through the BTCC valve to the compressor inlet while exhaust gas (e.g., a scavenging portion) is preferentially flowed through the SMBV to the exhaust passage due to the configuration of the ported scavenge manifold (as described above with reference to FIG. 2). This prevents potential catalyst degradation that may occur if the blowthrough air were instead flowed through the SMBV to the exhaust passage (e.g., if the BTCC valve was closed to restrict compressor flow). At time t2, the compressor speed (plot 708) surpasses the first, lower speed threshold S1, such as due to an increase in engine speed, and so the engine system is transitioned back to operating in the baseline EGR and BTCC mode. In response, the SMBV is closed (plot 712).

At time t3, the compressor inlet temperature increases above the threshold temperature T1. In response to this condition, the engine system is again switched to the restricted compressor flow mode of operation to reduce the flow of hotter exhaust gases to the compressor. As before, the SMBV is fully opened (plot 712), and the BTCC valve is maintained in the fully open position. At time t4, the compressor temperature decreases below the threshold temperature T1, and so the engine system is transitioned back to operating in the baseline EGR and BTCC mode by closing the SMBV (plot 712) and increasing EGR demand (plot 704). However, at time t4, the EGR demand (plot 704) is lower than at time t1 (e.g., due to a decreased engine load, as shown in plot 702). The amount of EGR provided may be decreased by adjusting cylinder valve timing (e.g., decreasing an amount of overlap between cylinder scavenge exhaust valves and cylinder intake valves), for example.

At time t5, the compressor speed (plot 708) surpasses the second, higher threshold speed. Further, the compressor inlet temperature (plot 706) surpasses the threshold temperature T1. Therefore, the engine system is transitioned to operating in the restricted compressor flow mode, and the SMBV is opened (plot 712) in order to flow the scavenging portion of exhaust to the exhaust passage. However, due to both the compressor inlet temperature and the compressor speed being higher than their respective thresholds, the BTCC valve is adjusted from the first amount of opening to a decreased amount of opening, as shown in plot 710. Between time t5 and time t6, in response to the compressor inlet temperature dropping below the first threshold temperature T1 while the compressor speed remains above the second threshold speed S2, the BTCC valve is returned to the first amount of opening (plot 710). In this way, the position of the BTCC valve is modulated to further decrease compressor flow as needed, based on the condition of the compressor.

At time t6, the compressor speed drops below the second threshold speed S2. Thus, restricted compressor flow conditions are no longer met. As a result, the SMBV (plot 712) is closed as the engine is transitioned back to the baseline EGR and BTCC mode, as restricted compressor flow conditions are no longer met. Thus, all of the EGR and blowthrough may flow to the compressor inlet via the second scavenge manifold and the first EGR passage.

By including a first scavenge manifold coupled to scavenge exhaust valves via a plurality of exhaust runners and a second scavenge manifold coupled to the scavenge exhaust valves via a plurality of ports, each port coupled to one exhaust runner, a gradient of gas composition that forms in the exhaust runners during scavenge exhaust valve activation can be utilized to preferentially flow fresh air to a compressor inlet and preferentially flow combusted gas to an exhaust passage during restricted compressor flow conditions (e.g., when flow of EGR and blowthrough to the compressor is decreased due to low turbine power, high compressor inlet temperature, etc.). In this way, scavenge manifold pressurization, which may cause gas (e.g., a mixture of fresh air and combusted gas) in the scavenge manifold(s) to flow back into the cylinder during the subsequent engine cycle and to the exhaust via blowdown exhaust valves, may be avoided. The mixture of fresh air and combusted gas may contain excess oxygen, which may degrade the ability of a downstream catalyst to reduce NOx and increase fuel consumption. Thus, the technical effect of including the ported second scavenge manifold is that catalyst degradation may be reduced and fuel economy may be increased during restricted compressor flow conditions, while also decreasing temperatures at the compressor inlet (e.g., via still flowing cooler blowthrough air to the compressor inlet via at least partially opening, instead of fully closing, the BTCC valve during the restricted compressor flow conditions).

As one example, a method for an engine is provided, comprising: from a first set of cylinder exhaust valves, flowing a first portion of exhaust gases to an exhaust passage, upstream of a turbocharger turbine; and from a second set of cylinder exhaust valves: first, flowing a second portion of exhaust gases to the exhaust passage, downstream of the turbocharger turbine and upstream of a catalyst; and then, flowing blowthrough air to an intake passage, upstream of a turbocharger compressor. In the preceding example, additionally or optionally, flowing blowthrough air includes flowing a mixture of fresh air and unburnt fuel to the intake passage during a positive valve overlap between opening of each cylinder exhaust valve of the second set of cylinder exhaust valves and a corresponding intake valve. In any or all of the preceding examples, additionally or optionally, flowing the second portion of exhaust gases to the exhaust passage includes flowing the second portion of exhaust gases from the second set of cylinder exhaust valves to a first scavenge manifold via a plurality of exhaust runners, each exhaust runner of the plurality of exhaust runners coupled to one cylinder exhaust valve of the second set of cylinder exhaust valves, and then flowing the second portion of exhaust gases from the first scavenge manifold to the exhaust passage via a bypass passage including a bypass valve and coupled to the exhaust passage, downstream of the turbocharger turbine and the catalyst. In any or all of the preceding examples, additionally or optionally, flowing the blowthrough air to the intake passage includes flowing the blowthrough air from the second set of cylinder exhaust valves to a second scavenge manifold via a plurality of ports, each port of the plurality of ports coupled to one exhaust runner of the plurality of exhaust runners, and then flowing the blowthrough air from the second scavenge manifold to the intake passage via an exhaust gas recirculation (EGR) passage including an EGR valve and coupled to the intake passage, upstream of the turbocharger compressor. In any or all of the preceding examples, additionally or optionally, flowing the second portion of exhaust gases to the exhaust passage from the second set of cylinder exhaust valves and then flowing blowthrough air to the intake passage from the second set of cylinder exhaust valves includes fully opening the bypass valve while holding the EGR valve open at a first amount of opening. In any or all of the preceding examples, additionally or optionally, fully opening the bypass valve while holding the EGR valve opening at the first amount of opening includes fully opening the bypass valve from a previously closed or partially closed position in response to a request for reduced exhaust flow to an inlet of the turbocharger compressor. In any or all of the preceding examples, additionally or optionally, the request for reduced exhaust flow to the inlet of the turbocharger compressor is generated in response to one or more of an inlet temperature of the turbocharger compressor reaching or surpassing a threshold inlet temperature and a speed of the turbocharger compressor reaching or surpassing a threshold speed. In any or all of the preceding examples, the method additionally or optionally further comprises adjusting the first amount of opening based on a condition of the turbocharger compressor, including decreasing the first amount of opening as one or more of: an inlet temperature of the turbocharger compressor increases further above a threshold temperature and a speed of the turbocharger compressor increases further above a threshold speed.

As another example, a system for an engine is provided, comprising: a first set of exhaust valves fluidly coupled to an exhaust passage, upstream of a turbocharger turbine; and a second set of exhaust valves fluidly coupled to each of: a first scavenge manifold via a plurality of exhaust runners, each exhaust runner coupled to one valve of the second set of exhaust valves, the first scavenge manifold coupled to the exhaust passage, downstream of the turbocharger turbine; and a second scavenge manifold via a plurality of ports, where each port is coupled to one exhaust runner of the plurality of exhaust runners, the second scavenge manifold coupled to an intake passage, upstream of a turbocharger compressor. In the preceding example, additionally or optionally, the first scavenge manifold is coupled to the exhaust passage, downstream of the turbocharger turbine and a first catalyst. In any or all of the preceding examples, additionally or optionally, the first scavenge manifold is coupled to the exhaust passage via a bypass passage including a bypass valve adapted to restrict flow to the exhaust passage. In any or all of the preceding examples, additionally or optionally, the bypass passage is coupled to the exhaust passage between the first catalyst and a second catalyst, the second catalyst positioned downstream of the turbocharger turbine. In any or all of the preceding examples, additionally or optionally, the second scavenge manifold is coupled to the intake passage, upstream of the turbocharger compressor, via an exhaust gas recirculation passage coupled between the second scavenge manifold and the intake passage, the exhaust gas recirculation passage including a valve adapted to restrict flow to an inlet of the turbocharger compressor. In any or all of the preceding examples, additionally or optionally, each port of the plurality of ports has a first end directly coupled to one exhaust runner, proximate to a corresponding valve of the second set of exhaust valves, and a second end directly coupled to the second scavenge manifold. In any or all of the preceding examples, additionally or optionally, the second end of each port is spaced away from second ends of adjacent ports, along a length of the second scavenge manifold, and wherein the valve in the exhaust gas recirculation passage is positioned downstream of where the plurality of ports couple to the second scavenge manifold. In any or all of the preceding examples, additionally or optionally, the first end of each port is positioned closer to the corresponding valve of the second set of exhaust valves than where the one exhaust runner couples to the first scavenge manifold. In any or all of the preceding examples, additionally or optionally, a diameter of each port of the plurality of ports is smaller than a diameter of each exhaust runner of the plurality of exhaust runners.

As another example, a system for an engine is provided, comprising: a plurality of cylinders, each cylinder including a first exhaust valve and a second exhaust valve; a blowdown exhaust manifold coupled to the first exhaust valve of each cylinder, the blowdown exhaust manifold coupled to an exhaust passage, upstream of a turbocharger turbine; a first scavenge exhaust manifold coupled to the second exhaust valve of each cylinder via an exhaust runner, the first scavenge exhaust manifold coupled to the exhaust passage, downstream of the turbocharger turbine and upstream of a catalyst; a second scavenge exhaust manifold coupled to the second exhaust valve of each cylinder via a port coupled to the exhaust runner, the second scavenge exhaust manifold coupled to an intake passage, upstream of a turbocharger compressor; and a controller with computer readable instructions stored on memory for: operating the first exhaust valve of each cylinder at a different timing that the second exhaust valve of each cylinder. In the preceding example, the system additionally or optionally further comprises a bypass passage coupling the first scavenge exhaust manifold to the exhaust passage, downstream of the turbocharger turbine and upstream of the catalyst; and an exhaust gas recirculation (EGR) passage coupling the second scavenge exhaust manifold to the intake passage, upstream of the turbocharger compressor, wherein the computer readable instructions further include instructions for opening a bypass valve disposed in the bypass passage and maintaining an EGR valve disposed in the EGR passage open in response to the turbocharger compressor reaching an operational threshold. In any or all of the preceding examples, additionally or optionally, the operational threshold includes one or more of an inlet temperature of the turbocharger compressor reaching or surpassing a threshold inlet temperature and a speed of the turbocharger compressor reaching or surpassing a threshold speed.

In another representation, a method for an engine comprises: during a first condition, flowing both exhaust gases and blowthrough air from cylinder scavenge exhaust valves to an inlet of a compressor of a turbocharger via a second scavenge manifold coupled to the cylinder scavenge exhaust valves via a plurality of ports; and during a second condition, flowing blowthrough air to the inlet of the compressor of the turbocharger via the second scavenge manifold and exhaust gases to an exhaust passage, downstream of a turbine of the turbocharger and upstream of a catalyst, via a first scavenge manifold, the first scavenge manifold fluidically coupled to each of the cylinder scavenge exhaust valves via a plurality of exhaust runners and the second scavenge manifold via the plurality of exhaust runners and plurality of ports. In the preceding example, additionally or optionally, the engine is operated in the first condition responsive to a request for exhaust gas recirculation (EGR), and the engine is operated in the second condition responsive to a restricted compressor flow condition. In any or all of the preceding examples, additionally or optionally, the restricted compressor flow condition includes at least one of a turbine power being less than a threshold power, a turbine speed being less than a first threshold speed, a compressor speed being greater than a second threshold speed, greater than the first, and a temperature of an inlet of the compressor being greater than a threshold temperature. In any or all of the preceding examples, the method additionally or optionally further comprises: during the first condition, opening an EGR valve disposed in an EGR passage coupling the second scavenge manifold to the inlet of the compressor to a first amount of opening and maintaining a scavenge manifold bypass valve (SMBV) disposed in a scavenge manifold bypass passage coupling the first scavenge manifold to the exhaust passage in a closed position; and during the second condition, maintaining the EGR valve at the first amount of opening and fully opening the SMBV. In any or all of the preceding examples, the method may include operating the cylinder scavenge exhaust valves at a different timing than cylinder blowdown exhaust valves, where each cylinder includes one cylinder scavenge exhaust valve coupled to each of the first scavenge manifold and the second scavenge manifold and one cylinder blowdown exhaust valve coupled to a blowdown manifold, the blowdown manifold adapted to flow exhaust gas to the turbine.

In still another representation, the vehicle systems described above are included in a hybrid vehicle system, further comprising an electric machine; a transmission; one or more vehicle wheels coupled to the transmission; a first clutch coupled between the engine and the transmission; and a second clutch coupled between the electric machine and the transmission. In the preceding example, additionally or optionally, engaging the first clutch couples the engine to the one or more vehicle wheels via the transmission. In any or all of the preceding examples, additionally or optionally, engaging the second clutch couples the electric machine to the one or more vehicle wheels via the transmission.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for an engine, comprising:
a plurality of cylinders, each of the plurality of cylinders including a first exhaust valve fluidly coupled to an exhaust passage, upstream of a turbocharger turbine, and a second exhaust valve fluidly coupled to each of:
  a first scavenge manifold via an exhaust runner, the first scavenge manifold coupled to the exhaust passage, downstream of the turbocharger turbine; and
  a second scavenge manifold via a port, where a first end of the port is directly coupled to the exhaust runner, proximate to the second exhaust valve, and a second end of the port is directly coupled to the second scavenge manifold, the second scavenge manifold coupled to an intake passage, upstream of a turbocharger compressor.

2. The system of claim 1, wherein the first scavenge manifold is coupled to the exhaust passage, downstream of the turbocharger turbine and a first catalyst.

3. The system of claim 2, wherein the first scavenge manifold is coupled to the exhaust passage via a bypass passage including a bypass valve adapted to restrict flow to the exhaust passage.

4. The system of claim 3, wherein the bypass passage is coupled to the exhaust passage between the first catalyst and a second catalyst, the second catalyst positioned downstream of the turbocharger turbine.

5. The system of claim 1, wherein the second scavenge manifold is coupled to the intake passage, upstream of the turbocharger compressor, via an exhaust gas recirculation passage coupled between the second scavenge manifold and the intake passage, the exhaust gas recirculation passage including a valve adapted to restrict flow to an inlet of the turbocharger compressor.

6. The system of claim 1, wherein the second end of the port of each of the plurality of cylinders is spaced away from second ends of adjacent ports along a length of the second scavenge manifold.

7. The system of claim 1, wherein the first end of the port is positioned closer to the second exhaust valve than where the exhaust runner couples to the first scavenge manifold.

8. The system of claim 1, wherein a diameter of the port is smaller than a diameter of the exhaust runner.

9. A system for an engine, comprising:
a plurality of cylinders, each cylinder including a first exhaust valve and a second exhaust valve;
a blowdown exhaust manifold coupled to the first exhaust valve of each cylinder, the blowdown exhaust manifold coupled to an exhaust passage, upstream of a turbocharger turbine;
a first scavenge exhaust manifold coupled to the second exhaust valve of each cylinder via an exhaust runner, the first scavenge exhaust manifold coupled to the exhaust passage, downstream of the turbocharger turbine and upstream of a catalyst;
a second scavenge exhaust manifold coupled to the second exhaust valve of each cylinder via a port coupled to the exhaust runner, the second scavenge exhaust manifold coupled to an intake passage, upstream of a turbocharger compressor;
a bypass passage coupling the first scavenge exhaust manifold to the exhaust passage, downstream of the turbocharger turbine and upstream of the catalyst, the bypass passage including a bypass valve disposed therein;
an exhaust gas recirculation (EGR) passage coupling the second scavenge exhaust manifold to the intake passage, upstream of the turbocharger compressor, the EGR passage including an EGR valve disposed therein; and
a controller with computer readable instructions stored on memory for:
  operating the first exhaust valve of each cylinder at a different timing than the second exhaust valve of each cylinder; and
  opening the bypass valve and maintaining the EGR valve open in response to the turbocharger compressor reaching an operational threshold.

10. The system of claim 9, wherein the operational threshold includes one or more of an inlet temperature of the turbocharger compressor reaching or surpassing a threshold inlet temperature and a speed of the turbocharger compressor reaching or surpassing a threshold speed.

* * * * *